(12) United States Patent
Takegami et al.

(10) Patent No.: US 7,155,928 B2
(45) Date of Patent: Jan. 2, 2007

(54) REFRIGERATING APPARATUS

(75) Inventors: Masaaki Takegami, Sakai (JP); Kenji Tanimoto, Sakai (JP)

(73) Assignee: Daikin Industries, Ltd., Osaka (JP)

(*) Notice: Subject to any disclaimer, the term of this patent is extended or adjusted under 35 U.S.C. 154(b) by 230 days.

(21) Appl. No.: 10/489,297

(22) PCT Filed: Jul. 2, 2003

(86) PCT No.: PCT/JP03/08446

§ 371 (c)(1),
(2), (4) Date: Mar. 11, 2004

(87) PCT Pub. No.: WO2004/008048

PCT Pub. Date: Jan. 22, 2004

(65) Prior Publication Data

US 2005/0115271 A1 Jun. 2, 2005

(30) Foreign Application Priority Data

Jul. 12, 2002 (JP) ............................. 2002-203486

(51) Int. Cl.
*F25B 1/00* (2006.01)
*F25B 49/00* (2006.01)

(52) U.S. Cl. .................. 62/498; 62/228.5; 62/510

(58) Field of Classification Search .................. 62/498, 62/510, 228.1, 228.3, 228.5, 175
See application file for complete search history.

(56) References Cited

FOREIGN PATENT DOCUMENTS

| GB | 938372 A | 10/1963 |
|---|---|---|
| JP | 63-069956 U | 5/1988 |
| JP | 02-126035 A | 5/1990 |
| JP | 09-178284 A | 7/1997 |
| JP | 2001-280749 A | 10/2001 |
| JP | 2001-349622 A | 12/2001 |
| JP | 2002-181406 A | 6/2002 |

Primary Examiner—Chen Wen Jiang
(74) Attorney, Agent, or Firm—Birch, Stewart, Kolasch, and Birch, LLP

(57) ABSTRACT

In a refrigerating apparatus in which a plurality of application-side heat exchangers (41, 45, 51) are connected to a heat-source side heat exchanger (4), liquid lines for a plurality of channels in a refrigerant circuit (1E) share a liquid side communication pipe (11) in order to reduce the number of pipes. Further, the liquid side communication pipe (11) is provided adjacent to a low-pressure gas side communication pipe (15) for at least one channel so as to contact it in order to supercool a liquid refrigerant by a low-pressure gas refrigerant. Thus, workability for connecting the pipes is improved and a refrigerating ability may not be decreased even if communication pipes (11, 15, 17) become long.

4 Claims, 12 Drawing Sheets

REFRIGERATING APPARATUS

TECHNICAL FIELD

The present invention relates to a refrigerating apparatus, and in particular to, a refrigerating apparatus which has application-side heat exchangers for a plurality of channels as cold-storage/freezing and air-conditioning heat exchangers.

BACKGROUND ART

Refrigerating apparatuses which perform a refrigerating cycle are conventionally known. The refrigerating apparatuses are widely utilized as an air-conditioning machine for performing air-cooling/heating in a room or a cooling machine such as a refrigerator for storing foods. Among the refrigerating apparatuses, there is a refrigerating apparatus which performs air-conditioning and cold-storage/freezing as disclosed in Japanese Patent Application Laid-Open (JP-A) No. 2001-280749.

In this type of refrigerating apparatus, application-side heat exchangers provided in application-side units including cold-storage/freezing showcases and an air-conditioning indoor machine are connected in parallel to a heat-source side heat exchanger in a heat-source side unit installed outdoor by liquid side communication pipes and gas side communication pipes, respectively. This refrigerating apparatus is installed at e.g., a convenience store and the like. By installing one refrigerating apparatus, air-conditioning within a store and cooling for showcases can be performed.

Problems to be Solved

In accordance with the refrigerating apparatus, communication pipes having diameters depending on the amount of refrigerant circulated and their lengths are selected. Nevertheless, when the length of the pipes is extremely long, a pressure loss for the refrigerant becomes large and thus a refrigerating ability may be easily decreased.

In the refrigerating apparatus, a refrigerant circuit is configured so as to have two channels, i.e., a cold-storage/freezing channel and an air-conditioning channel. Two communication pipes are used for a liquid line and a gas line, respectively and thus the number of pipes becomes large. Work for connecting such pipes is complicated and the pipes may be connected in a wrong manner.

The present invention was developed in view of such problems, and an object of the present invention is to improve workability of connecting pipes and to prevent a decrease in refrigerating ability even if the length of the pipes becomes long in a refrigerating apparatus in which a plurality of application-side heat exchangers are connected to a compression mechanism and a heat-source side heat exchanger.

DISCLOSURE OF INVENTION

In accordance with the present invention, a plurality of liquid lines are integrated into a liquid side communication pipe. The liquid side communication pipe is disposed adjacent to a low-pressure gas side communication pipe for a gas line so as to contact it. As a result, a liquid refrigerant can heat-exchange with a gas refrigerant to be supercooled by the gas refrigerant at the suction side.

Specifically, in accordance with a first invention, it is presupposed to provide a refrigerating apparatus which comprises a refrigerant circuit (1E) in which compression mechanisms (2D, 2E), a heat-source side heat exchanger (4), expansion mechanisms (26, 42, 46, 52) and application-side heat exchangers (41, 45, 51) are connected together, and in which the application-side heat exchangers (41, 45, 51) for a plurality of channels are connected in parallel to the compression mechanisms (2D, 2E) and the heat-source side heat exchanger (4).

In the refrigerating apparatus, liquid lines for the plurality of channels in the refrigerant circuit (1E) share a liquid side communication pipe (11), and the liquid side communication pipe (11) is provided adjacent to a low-pressure gas side communication pipe (15) for a gas line of at least one channel so as to contact it.

In accordance with the first invention, a refrigerant is circulated within a refrigerant circuit (1E) by being branched into a plurality of channels. On the other hand, in a liquid line, refrigerants from the plurality of channels are joined and the joined refrigerant flows in one liquid side communication pipe (11). As the liquid side communication pipe (11) is provided adjacent to the low-pressure gas side communication pipe (15) for a gas line of at least one channel so as to contact it, a liquid refrigerant flowing in the liquid side communication pipe (11) heat-exchanges with a refrigerant flowing in the low-pressure gas side communication pipe (15) so as to be supercooled.

In accordance with a second invention, it is presupposed to provide a refrigerating apparatus which comprises a refrigerant circuit (1E) in which compression mechanisms (2D, 2E), a heat-source side heat exchanger (4), expansion mechanisms (26, 42, 46, 52) and application-side heat exchangers (41, 45, 51) are connected together, and in which the application-side heat exchangers (45, 51) for a cold-storage/freezing channel and the application-side heat exchanger (41) for an air-conditioning channel are connected in parallel to the compression mechanism (2D, 2E) and the heat-source side heat exchanger (4) and the compression mechanisms (2D, 2E) are configured so as to be capable of switching a plurality of compressors (2A, 2B, 2C) between for the cold-storage/freezing channel and for the air-conditioning channel.

In accordance with this refrigerating apparatus, liquid lines for both of the channels share a liquid side communication pipe (11), and the liquid side communication pipe (11) is provided adjacent to a low-pressure gas side communication pipe (15) for a gas line in the cold-storage/freezing channel so as to contact it.

In accordance with the second invention, a refrigerant is circulated in the refrigerant circuit (1E) by branched into the cold-storage/freezing channel and the air-conditioning channel. In a liquid line, branched refrigerants join and the joined refrigerant flows in one liquid side communication pipe (11). As the liquid side communication pipe (11) is provided adjacent to the low-pressure gas side communication pipe (15) for a gas line of the cold-storage/freezing channel so as to contact it, a liquid refrigerant flowing in the liquid side communication pipe (11) heat-exchanges with a refrigerant flowing in the low-pressure gas side communication pipe (15) for the cold-storage/freezing channel so as to be supercooled.

In accordance with a third invention, the refrigerating apparatus of the first or second invention further comprises a liquid injection pipe (27) for supplying a part of liquid refrigerant circulating in the refrigerant circuit (1E) to suction sides of the compression mechanisms (2D, 2E).

In accordance with the third invention, when the liquid refrigerant is supercooled by the gas refrigerant at the suction side, the gas refrigerant is superheated. Even if a gas refrigerant with a large degree of superheat is sucked by the compression mechanisms (2D, 2E), it is possible to prevent the degree of superheat from being excessively large by performing liquid injection.

In accordance with a fourth invention, in the refrigerating apparatus of the first or second invention, the liquid side communication pipe (11) and the low-pressure gas side communication pipe (15) which are disposed adjacent to each other are surrounded by a heat transfer material (12).

In accordance with a fifth invention, in the refrigerating apparatus of the fourth invention, an aluminum tape material (12) is wound, as a heat transfer material, around the liquid side communication pipe (11) and the low-pressure gas side communication pipe (15).

In accordance with the fourth and fifth inventions, a liquid refrigerant is efficiently supercooled by a gas refrigerant at the suction side via the heat transfer material (12) such as, e.g., an aluminum tape material.

Effects

In accordance with the first invention, liquid lines for a plurality of channels in the refrigerant circuit (1E) share one liquid side communication pipe (11), and the liquid side communication pipe (11) is provided adjacent to the low-pressure gas side communication pipe (15) for a gas line of at least one channel so as to contact it in order to supercool a liquid refrigerant by a gas refrigerant. Thus, a refrigerant having lower enthalpy can be supplied to the application-side heat exchangers (41, 45, 51). For this reason, the difference in enthalpy between refrigerants at entrances/exits for the application-side heat exchangers (41, 45, 51) becomes large, and a decrease in refrigerating ability can be prevented even if pipes are long.

As liquid lines for a plurality of channels are integrated into one liquid side communication liquid pipe (11), the total number of communication pipes is reduced. Accordingly, work for connecting pipes is easily performed and the possibility of connecting wrong pipes is reduced. Namely, workability for piping is improved.

In accordance with the second invention, in the refrigerant circuit (1E) having the cold-storage/freezing-channel and the air-conditioning channel, a joined liquid refrigerant from both of the channels is supercooled by a sucked gas refrigerant for the cold-storage/freezing channel. A decrease in ability can be prevented and the workability for piping can be improved. In the case of the apparatus having the cold-storage/freezing channel and the air-conditioning channel separately, a direction that a refrigerant is circulated is fixed in the cold-storage/freezing channel and a gas line is not switched between the discharge side and the suction side. Accordingly, the low-pressure gas side communication pipe (15) for the cold-storage/freezing channel and the joined liquid side communication pipe (11) for both of the channels can be easily provided adjacent to each other. As the communication pipe (17) in a gas line for the air-conditioning channel is not provided adjacent to the liquid side communication pipe (11), it can be configured so as to perform air-cooling/air-heating by switching directions in which a refrigerant circulates.

In accordance with the third invention, there is provided the liquid injection pipe (27) for supplying a part of liquid refrigerant circulating in the refrigerant circuit (1E) to the suction sides of the compression mechanisms (2D, 2E). Thus, even if a degree of superheat of the gas refrigerant at the suction side becomes large when a liquid refrigerant is supercooled by the gas refrigerant at the suction side, performing liquid injection can prevent the degree of super- heat from being excessively large in a compression process. As a result, because of structures of the first and second inventions, a refrigerating apparatus in which a decease in workability is suppressed while a decrease in ability is prevented can be reliably put to practical use.

In accordance with the fourth invention, the liquid side communication pipe (11) and the low-pressure gas side communication pipe (15) are surrounded by the heat transfer material (12). Accordingly, a liquid refrigerant can be reliably supercooled by a gas refrigerant via the heat transfer material (12). Further, a heat exchanger dedicated to supercooling of a liquid refrigerant is not required and thus the structure cannot be complicated.

In accordance with the fifth invention, the aluminum tape material (12) is wound, as a heat transfer material, around the liquid side communication pipe (11) and the low-pressure gas side communication pipe (15). Thus, supercooling of a liquid refrigerant by a low-pressure gas refrigerant can be realized by an extremely simple structure.

BEST MODE FOR CARRYING OUT THE INVENTION

An embodiment of the present invention will be described in detail hereinafter based on the drawings.

Figure 1:
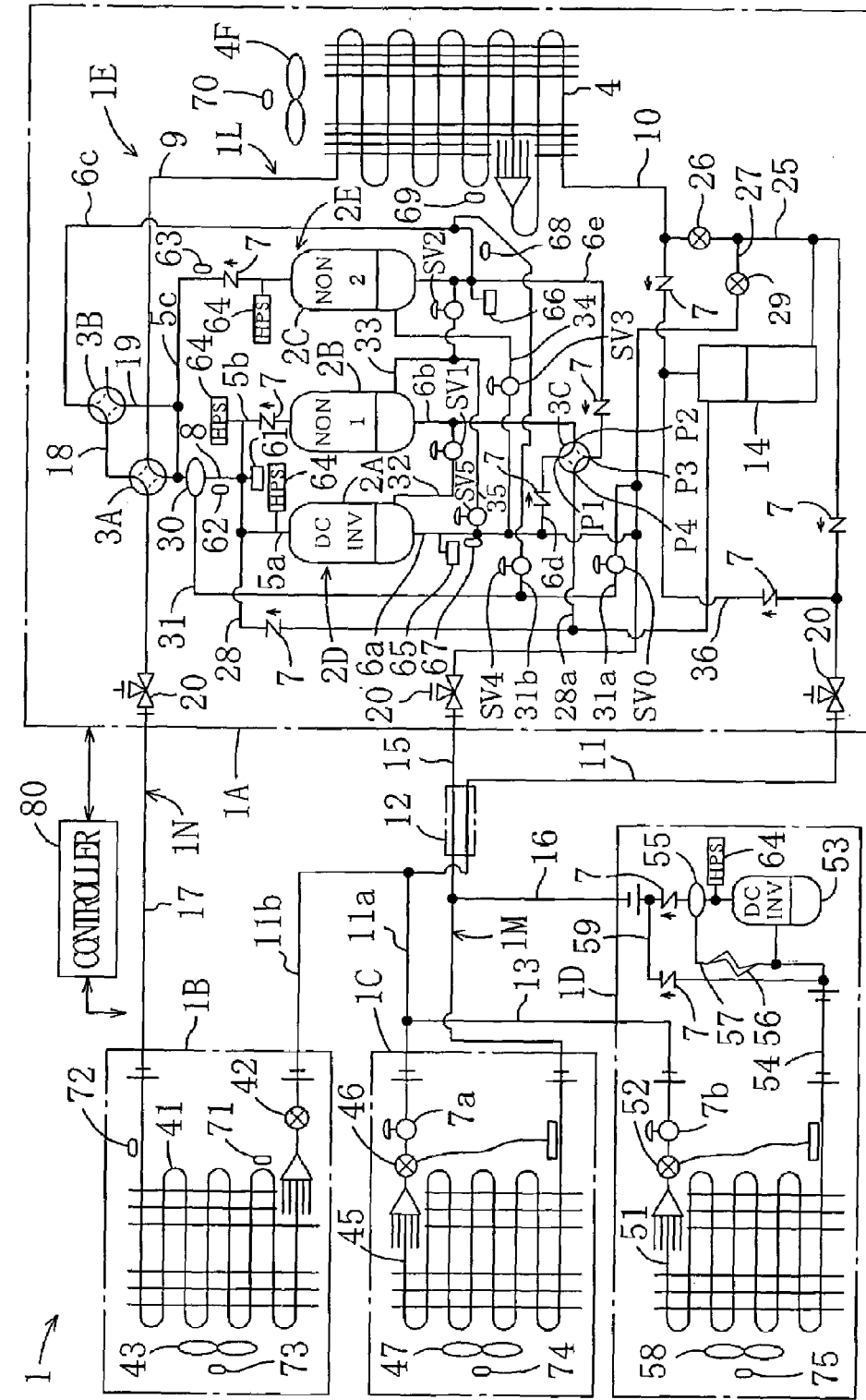
FIG. 1 is a refrigerant circuit diagram of a refrigerating apparatus relating to an embodiment of the present invention.

As shown in FIG. 1, a refrigerating apparatus (1) relating to this embodiment is installed at convenience stores and is used to perform cooling of cold-storage showcases and freezing showcases and air-cooling/heating in the stores.

The refrigerating apparatus (1) has an outdoor unit (1A), an indoor unit (1B), a cold-storage unit (1C) and a freezing unit (1D), and comprises a refrigerant circuit (1E) performing a vapor-compression refrigerating cycle. The refrigerant circuit (1E) is provided with a first channel side circuit for cold-storage/freezing and a second channel side circuit for air-conditioning. The refrigerant circuit (1E) is configured so as to be switched between an air-cooling cycle and an air-heating cycle.

The indoor unit (1B) is configured to perform an air-cooling operation and an air-heating operation by switching such operations and is installed at, e.g., salesrooms. The cold-storage unit (1C) is installed at cold-storage showcases to cool air within the showcases. The freezing unit (1D) is installed at freezing showcases to cool air within the showcases. Although only one indoor unit (1B), one cold-storage unit (1C) and one freezing unit (1D) are illustrated in the figure, two indoor units (1B), eight cold-storage units (1C) and one freezing unit (1D) are connected in this embodiment.

<Outdoor Unit>

The outdoor unit (1A) comprises an inverter compressor (2A) serving as a first compressor, a first non-inverter compressor (2B) serving as a second compressor and a second non-inverter compressor (2C) serving as a third compressor. Further, the outdoor unit (1A) comprises a first four-way selector valve (3A), a second four-way selector valve (3B), a third four-way selector valve (3C) and an outdoor heat exchanger (4) serving as a heat-source side heat exchanger.

Each of the compressors (2A, 2B, 2C) is configured by a closed type high-pressure dome scroll compressor. The inverter compressor (2A) is a compressor having a variable capacity in which an electric motor is controlled by an inverter such that the capacity is varied continuously or stepwise. The first non-inverter compressor (2B) and the second non-inverter compressor (2C) are compressors having a constant capacity in which an electric motor is always driven at a certain revolution.

The inverter compressor (2A), the first non-inverter compressor (2B) and the second non-inverter compressor (2C) constitute compression mechanisms (2D, 2E) for the refrigerating apparatus (1). The compression mechanisms (2D, 2E) are configured by a compression mechanism (2D) for the first channel and a compression mechanism (2E) for the second channel. Specifically, in accordance with the compression mechanisms (2D, 2E), during operation, there are provided a case in which the inverter compressor (2A) and the first non-inverter compressor (2B) constitute the compression mechanism (2D) for the first channel and the second non-inverter compressor (2C) constitutes the compression mechanism (2E) for the second channel and a case in which the inverter compressor (2A) constitutes the compression mechanism (2D) for the first channel and the first non-inverter compressor (2B) and the second non-inverter compressor (2C) constitute the compression mechanism (2E) for the second channel. Namely, while the inverter compressor (2A) is used for the first channel side circuit for cold-storage/freezing and the second non-inverter compressor (2C) is used for the second channel side circuit for air conditioning in a fixed manner, the first non-inverter compressor (2B) is used so as to be switched between for the first channel side circuit and for the second channel side circuit.

Discharge pipes (5a, 5b, 5c) for the above-described inverter compressor (2A), the first non-inverter compressor (2B) and the second non-inverter compressor (2C) are connected to a high-pressure gas pipe (discharge pipe) (8), and the high-pressure gas pipe (8) is connected to a port of the first four-way selector valve (3A). The discharge pipe (5b) for the first non-inverter compressor (2B) and the discharge pipe (5c) for the second non-inverter compressor (2C) are respectively provided with a check valve (7).

A gas side end portion of the outdoor heat exchanger (4) is connected to a port of the first four-way selector valve (3A) by an outdoor gas pipe (9). Connected to a liquid side end portion of the outdoor heat exchanger (4) is one end of a liquid pipe (10) serving as a liquid line. A receiver (14) is provided in the half way of the liquid pipe (10). The other end of the liquid pipe (10) is connected to a communication liquid pipe (liquid side communication pipe) (11).

The outdoor heat exchanger (4) is, e.g., a fin-and-tube heat exchanger of cross-fin type, and an outdoor fan (4F) serving as a heat source fan is disposed so as to be adjacent to the exchanger (4).

Connected to a port for the first four-way selector valve (3A) is a communication gas pipe (17). A port for the first four-way selector valve (3A) is connected to a port for the second four-way selector valve (3B) by a connecting pipe (18). A port for the second four-way selector valve (3B) is connected to the discharge pipe (5c) for the second non-inverter compressor (2C) by an auxiliary gas pipe (19). A port for the second four-way selector valve (3B) is connected to a suction pipe (6c) for the second non-inverter compressor (2C). A port for the second four-way selector valve (3B) is configured as a closed port. Namely, the second four-way selector valve (3B) may be a three-way selector valve.

The first four-way selector valve (3A) is configured so as to be switched between a first state (see the solid lines in FIG. 1) in which the high-pressure gas pipe (8) communicates with the outdoor gas pipe (9) and the connecting pipe (18) communicates with the communication gas pipe (17) and a second state (see the broken lines in FIG. 1) in which the high-pressure gas pipe (8) communicates with the communication gas pipe (17) and the connecting pipe (18) communicates with the outdoor gas pipe (9).

The second four-way selector valve (3B) is configured so as to be switched between a first state (see the solid lines in FIG. 1) in which the auxiliary gas pipe (19) communicates with the closed port and the connecting pipe (18) communicates with the suction pipe (6c) for the second non-inverter compressor (2C) and a second state (see the broken lines in FIG. 1) in which the auxiliary gas pipe (19) communicates with the connecting pipe (18) and the suction pipe (6c) communicates with the closed port.

A suction pipe (6a) for the inverter compressor (2A) is connected to a low-pressure gas pipe (low-pressure gas side communication pipe) (15) for the first channel side circuit. The suction pipe (6c) for the second non-inverter compressor (2C) is connected via the first and second four-way selector valves (3A, 3B) to the low-pressure gas pipe for the second channel side circuit (the communication gas pipe (17) or the outdoor gas pipe (9)). A suction pipe (6b) for the first non-inverter compressor (2B) is connected via the third four-way selector valve (3C) to be described later to the suction pipe (6a) for the inverter compressor (2A) and the suction pipe (6c) for the second non-inverter compressor (2C).

Specifically, connected to the suction pipe (6a) for the inverter compressor (2A) is a branch pipe (6d), and connected to the suction pipe (6c) for the second non-inverter compressor (2C) is a branch pipe (6e). The branch pipe (6d) from the suction pipe (6a) for the inverter compressor (2A) is connected via the check valve (7) to a first port (P1) for the third four-way selector valve (3C). The suction pipe (6b) for the first non-inverter compressor (2B) is connected to a second port (P2) for the third four-way selector valve (3C). The branch pipe (6e) from the suction pipe (6c) for the second non-inverter compressor (2C) is connected via the check valve (7) to a third port (P3) for the third four-way selector valve (3C). Further, connected to a fourth port (P4) for the third four-way selector valve (3C) is a branch pipe (28a) from a gas vent pipe (28) from the receiver (14) to be described later. The check valves provided on the branch pipes (6d, 6e) allow only a refrigerant flow toward the third four-way selector valve (3C).

The third four-way selector valve (3C) is configured so as to be switched between a first state (see the solid lines in the figure) in which the first port (P1) communicates with the second port (P2) and the third port (P3) communicates with the fourth port (P4) and a second state (see the broken lines in the figure) in which the first port (P1) communicates with the fourth port (P4) and the second port (P2) communicates with the third port (P3).

The discharge pipes (5a, 5b, 5c), the high-pressure gas pipe (8) and the outdoor gas pipe (9) constitute a high-pressure gas line (1L) at the time of air-cooling operation. The discharge pipes (5a, 5b, 5c), the high-pressure gas pipe (8) and the communication gas pipe (17) constitute a high-pressure gas line (1N) at the time of air-heating operation. The low-pressure gas pipe (15) and the suction pipes (6a, 6b) for the compression mechanism (2D) for the first channel constitute a first low-pressure gas line (1M). The communication gas pipe (17) and the suction pipe (6c) for the compression mechanism (2E) for the second channel constitute a low-pressure gas line (1N) at the time of the air-cooling operation. The outdoor gas pipe (9) and the suction pipe (6c) constitute a low-pressure gas line (1L) at the time of the air-heating operation. The communication gas pipe (17) is switched to be high-pressure gas line or the low-pressure gas line depending on operational states. The low-pressure gas pipe (15) is always a low-pressure gas line when a refrigerant flows therethrough regardless of the operational states.

The communication liquid pipe (11), the communication gas pipe (17) and the low-pressure gas pipe (15) are extended outside from the outdoor unit (1A). Stop valves (20) are provided within the outdoor unit (1A) so as to correspond to such pipes.

An auxiliary liquid pipe (25) for bypassing the receiver (14) is connected to the liquid pipe (10). A refrigerant flows in the auxiliary liquid pipe (25) mainly at the time of air-heating. The auxiliary liquid pipe (25) is provided with an outdoor expansion valve (26) serving as an expansion mechanism. The check valve (7) allowing only a refrigerant flow toward the receiver (14) is provided on the liquid pipe (10) between the outdoor heat exchanger (4) and the receiver (14). The check valve (7) is placed between a connecting point with the auxiliary liquid pipe (25) and the receiver (14) on the liquid pipe (10).

The liquid pipe (10) is branched between the check valve (7) and the receiver (14) (into a branch liquid pipe (36)). The branch liquid pipe (36) is connected between the stop valve (20) and the check valve (7) to be described later on the liquid pipe (10). The branch liquid pipe (36) is provided with the check valve (7) allowing a refrigerant flow from a connecting point with the liquid pipe (10) toward the receiver (14).

The liquid pipe (10) is provided with the check valve (7) between a connecting point with the auxiliary liquid pipe (25) and the stop valve (20). This check valve (7) allows only a refrigerant flow from the receiver (14) toward the stop valve (20).

A liquid injection pipe (27) is connected between the auxiliary liquid pipe (25) and the low-pressure gas pipe (15). The liquid injection pipe (27) is provided with an electronic expansion valve (29). A gas vent pipe (28) is connected between the upper portion of the receiver (14) and the discharge pipe (5a) for the inverter compressor (2A). The gas vent pipe (28) is provided with the check valve (7) allowing only a refrigerant flow from the receiver (14) toward the discharge pipe (5a). As described above, the branch pipe (28a) from the gas vent pipe (28) is connected to the fourth port (P4) of the third four-way selector valve (3C).

An oil separator (30) is provided at the high-pressure gas pipe (8). One end of an oil return pipe (31) is connected to the oil separator (30). The other end of the oil return pipe (31) is branched into a first oil return pipe (31a) and a second oil return pipe (31b). The first oil return pipe (31a) is provided with a solenoid valve (SV0) and is connected via the liquid injection pipe (27) to the suction pipe (6a) for the inverter compressor (2A). The second oil return pipe (31b) is provided with a solenoid valve (SV4) and is connected to the suction pipe (6c) for the second non-inverter compressor (2C).

A first oil-level equalizing pipe (32) is connected between the dome (oil pool) of the inverter compressor (2A) and the suction pipe (6b) for the first non-inverter compressor (2B). A second oil-level equalizing pipe (33) is connected between the dome of the first non-inverter compressor (2B) and the suction pipe (6c) for the second non-inverter compressor (2C). A third oil-level equalizing pipe (34) is connected between the dome of the second non-inverter compressor (2C) and the suction pipe (6a) for the inverter compressor (2A). The first oil-level equalizing pipe (32), the second oil-level equalizing pipe (33) and the third oil-level equalizing pipe (34) are respectively provided with solenoid valves (SV1, SV2, SV3) as open/close mechanisms. The second oil-level equalizing pipe (33) is branched into a fourth oil-level equalizing pipe (35) between the dome of the first non-inverter compressor (2B) and the solenoid valve (SV2). The fourth oil-level equalizing pipe (35) is provided with a solenoid valve (SV5) and joins the suction pipe (6a) for the first compressor (2A).

<Indoor Unit>

The indoor unit (1B) includes an indoor heat exchanger (air-conditioning heat exchanger) (41) serving as an application-side heat exchanger and an indoor expansion valve (42) serving as an expansion mechanism. The gas side of the indoor heat exchanger (41) is connected to the communication gas pipe (17). The liquid side of the indoor heat exchanger (41) is connected via the indoor expansion valve (42) to a second branch pipe (11b) from the communication liquid pipe (11). The indoor heat exchanger (41) is, e.g., a fin-and-tube heat exchanger of cross-fin type. An indoor fan (43) serving as an application-side fan is disposed in the vicinity of the indoor heat exchanger (41). The indoor expansion valve (42) is configured by an electronic expansion valve.

<Cold-Storage Unit>

The cold-storage unit (1C) includes a cold-storage heat exchanger (45) serving as a cooling heat exchanger (evaporator) and a cold-storage expansion valve (46) serving as an expansion mechanism. The liquid side of the cold-storage heat exchanger (45) is connected via a solenoid valve (7a) and the cold-storage expansion valve (46) to the first branch pipe (11a) of the communication liquid pipe (11). Namely, the cold-storage expansion valve (46) and the solenoid valve (7a) serving as an open/close valve are provided at the upstream side of the cold-storage heat exchanger (45). The solenoid valve (7a) is used to stop a refrigerant flow at the time of a thermo-off operation. The gas side of the cold-storage heat exchanger (45) is connected to the low-pressure gas pipe (15).

The cold-storage heat exchanger (45) communicates with the suction side of the compression mechanism (2D) for the first channel. The indoor heat exchanger (41) communicates with the suction side of the second non-inverter compressor (2C) during the air-cooling operation. A refrigerant pressure (evaporation pressure) of the cold-storage heat exchanger (45) is lower than that of the indoor heat exchanger (41). As a result, a refrigerant evaporation temperature of the cold-storage heat exchanger (45) is, e.g., −10° C., and the refrigerant evaporation temperature of the indoor heat exchanger (41) is, e.g., +5° C. The refrigerant circuit (1E) structures a circuit for performing evaporation at different temperatures.

The cold-storage expansion valve (46) is a temperature-sensitive expansion valve and a temperature sensing bulb is mounted to the gas side of the cold-storage heat exchanger (45). The opening of the cold-storage expansion valve (46) is adjusted on the basis of a refrigerant temperature at the exit side of the cold-storage heat exchanger (45). The cold-storage heat exchanger (45) is, e.g., a fin-and-tube heat exchanger of cross-fin type. A cold-storage fan (47) serving as a cooling fan is disposed in the vicinity of the cold-storage heat exchanger (45).

<Freezing Unit>

The freezing unit (1D) includes a freezing heat exchanger (51) serving as a cooling heat exchanger, a freezing expansion valve (52) serving as an expansion mechanism and a booster compressor (53) serving as a freezing compressor. Connected to the liquid side of the freezing heat exchanger (51) is a branch liquid pipe (13) branched from the first branch pipe (11a) of the communication liquid pipe (11) via a solenoid valve (7b) and the freezing expansion valve (52).

The gas side of the freezing heat exchanger (51) is connected to the suction side of the booster compressor (53) by a connecting gas pipe (54). A branch gas pipe (16) branched from the low-pressure gas pipe (15) is connected to the discharge side of the booster compressor (53). The branch gas pipe (16) is provided with the check valve (7) and an oil separator (55). An oil return pipe (57) having a capillary tube (56) is connected between the oil separator (55) and the connecting gas pipe (54).

The booster compressor (53) compresses a refrigerant by two steps with the compression mechanism (2D) for the first channel so that the refrigerant evaporation temperature of the freezing heat exchanger (51) is lower than that of the cold-storage heat exchanger (45). The refrigerant evaporation temperature of the freezing heat exchanger (51) is set to be, e.g., −35° C.

The freezing expansion valve (52) is a temperature-sensitive expansion valve and a temperature sensing bulb is mounted to the gas side of the cold-storage heat exchanger (45). The freezing heat exchanger (51) is, e.g., a fin-and-tube heat exchanger of cross-fin type. A freezing fan (58) serving as a cooling fan is disposed in the vicinity of the freezing heat exchanger (51).

A bypass pipe (59) having the check valve (7) is connected between the connecting gas pipe (54) at the suction side of the booster compressor (53) and the downstream side of the check valve (7) on the branch gas pipe (16) at the discharge side of the booster compressor (53). The bypass pipe (59) is configured so as to bypass the booster compressor (53) to enable flowing of a refrigerant when the booster compressor (53) is stopped because of failures.

<Control Channel>

The refrigerant circuit (1E) is provided with various sensors and switches. The high-pressure gas pipe (8) in the outdoor unit (1A) is provided with a high-pressure sensor (61) serving as pressure detection means for detecting a high-level refrigerant pressure and a discharge temperature sensor (62) serving as temperature detection means for detecting a high-pressure refrigerant temperature. The discharge pipe (6c) for the second non-inverter compressor (2C) is provided with a discharge temperature sensor (63) serving as temperature detection means for detecting a high-pressure refrigerant temperature. The discharge pipes (5a, 5b, 5c) for the inverter compressor (2A), the first non-inverter compressor (2B) and the second non-inverter compressor (2C) are respectively provided with a pressure switch (64) which is opened when the high-level refrigerant pressure reaches a predetermined value.

The suction pipes (6a, 6c) of the inverter compressor (2A) and the second non-inverter compressor (2C) are respectively provided with low-pressure sensors (65, 66) serving as pressure detection means for detecting a low-level refrigerant pressure and suction temperature sensors (67, 68) serving as temperature detection means for detecting a low-pressure refrigerant temperature.

The outdoor heat exchanger (4) is provided with an outdoor heat exchanger sensor (69) serving as temperature detection means for detecting an evaporation temperature or condensation temperature which is a refrigerant temperature in the outdoor heat exchanger (4). The outdoor unit (1A) is provided with an outside air temperature sensor (70) serving as temperature detection means for detecting an outdoor air temperature.

The indoor heat exchanger (41) is provided with an indoor heat exchanger sensor (71) serving as temperature detection means for detecting an evaporation temperature or condensation temperature which is a refrigerant temperature in the indoor heat exchanger (41). Further, a gas temperature sensor (72) serving as temperature detection means for detecting a gas refrigerant temperature is provided at the gas side of the indoor heat exchanger (41). Moreover, the indoor unit (1B) is provided with a room temperature sensor (73) serving as temperature detection means for detecting an indoor air temperature.

A cold-storage temperature sensor (74) serving as temperature detection means for detecting a temperature within cold-storage showcases is provided in the cold-storage unit (1C). A freezing temperature sensor (75) serving as temperature detection means for detecting a temperature within freezing showcases is provided in the freezing unit (1D). The pressure switch (64) which is opened when the pressure of a discharged refrigerant reaches a predetermined value is provided at the discharge side of the booster compressor (53).

Output signals from various sensors and switches are inputted to a controller (80). This controller (80) is configured so as to control the operation of the refrigerant circuit (1E) and to perform control by switching eight kinds of operation modes to be described later. The controller (80) controls, at the time of operation, start, stop and capacity control for the inverter compressor (2A), start and stop for the first non-inverter compressor (2B) and the second non-inverter compressor (2C) and opening adjustment for the outdoor expansion valve (26) and the indoor expansion valve (42). Further, the controller (80) also performs switching of the four-way selector valves (3A, 3B, 3C), open/close operation for the solenoid valves (SV0, SV1, SV2, SV3, SV4, SV5) of the oil return pipes (31a, 31b) and the oil-level equalizing pipes (32, 33, 34, 35) and opening adjustment for the electronic expansion valve (29) of the liquid injection pipe (27).

<Communication Pipes>

One communication liquid pipe (11) is provided at the exit of the outdoor unit (1A). Two liquid lines for the first channel side circuit for cold-storage/freezing and the second channel side circuit for air-conditioning are integrated into the one communication liquid pipe (11). The communication liquid pipe (11) is branched into the branch pipes (11a, 11b) for the respective channels in the vicinity of the application-side units (1B, 1C, 1D).

The communication liquid pipe (11) is provided adjacent to the low-pressure gas pipe (15) serving as a suction gas line in the first channel side circuit for cold-storage/freezing so as to contact it. An aluminum tape material (12) serving as a heat transfer material is wound around the communication liquid pipe (11) and the low-pressure gas pipe (15), so that these two communication pipes (11, 15) are surrounded by the heat transfer material (12). The contacted portion of the communication pipes (11, 15) constitutes a heat exchanger in which a liquid refrigerant heat-exchanges with a low-pressure gas refrigerant.

In accordance with the refrigerating apparatus (1), the outdoor unit (1A), the indoor unit (1B), the cold-storage unit (1C) and the freezing unit (1D) are respectively installed. Then, the units (1A, 1B, 1C, 1D) are connected together by three communication pipes (11, 15, 17) and the stop valves (20) are opened. As a result, a refrigerant can be circulated in the refrigerant circuit (1E). In accordance with the refrigerating apparatus (1), the refrigerant circuit (1E) includes a first channel for cold-storage/freezing and a second channel for air-conditioning. Nevertheless, the communication liquid pipe (11) is common to the respective channels. Consequently, work for connecting pipes can be easily carried out as compared to the case that communication liquid pipes are separately provided for the respective channels.

Operation

Next, operations performed by the above-described refrigerating apparatus (1) will be described respectively. In accordance with this embodiment, it is configured so as to be capable of setting eight kinds of operation modes as follows. Specifically, it is configured so as to be capable of performing ① air-cooling operation of performing only air-cooling in the indoor unit (1B), ② freezing operation of only performing cooling in the cold-storage unit (1C) and the freezing unit (1D), ③ first air-cooling/freezing operation of simultaneously performing air-cooling in the indoor unit (1B) and cooling in the cold-storage unit (1C) and the freezing unit (1D), ④ second air-cooling/freezing operation performed when an air-cooling ability of the indoor unit (1B) is insufficient at the time of the first air-cooling/freezing operation, ⑤ air-heating operation of performing only air-heating in the indoor unit (1B), ⑥ first air-heating/freezing operation of performing air-heating in the indoor unit (1B) and cooling in the cold-storage unit (1C) and the freezing unit (1D) by a heat recovery operation without using the outdoor heat exchanger (4), ⑦ second air-heating/freezing operation with excessive air-heating ability performed when an air-heating ability of the indoor unit (1B) is superfluous at the time of the first air-heating/freezing operation and ⑧ third air-heating/freezing operation with insufficient air-heating ability performed when the air-heating ability of the indoor unit (1B) is insufficient during the first air-heating/freezing operation.

The respective operations will be described specifically.

<Air-Cooling Operation>

Figure 2:
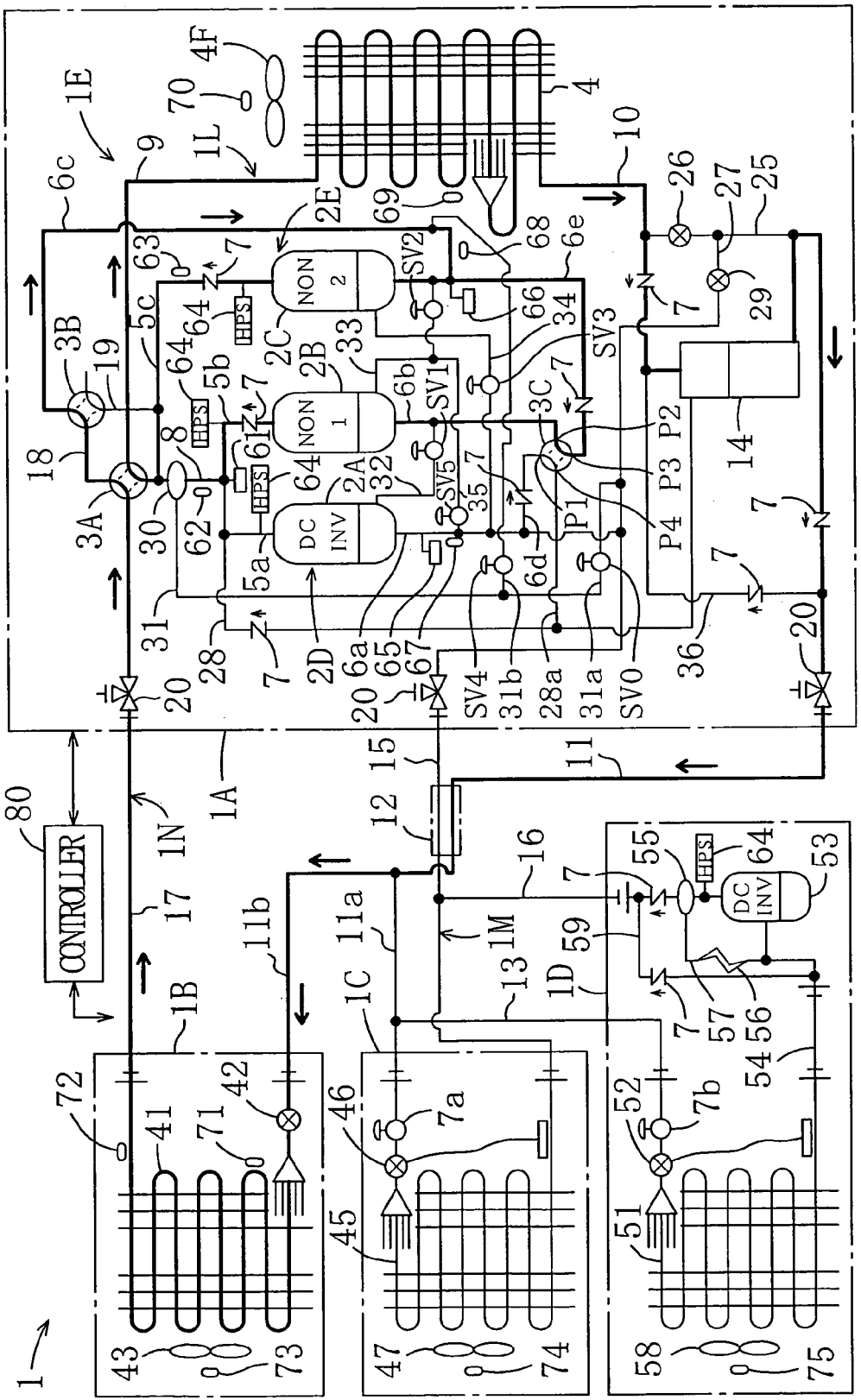
FIG. 2 is a refrigerant circuit diagram illustrating the operation of an air-cooling operation.

The air-cooling operation is an operation of performing only air-cooling in the indoor unit (1B). At the time of the air-cooling operation, as shown in FIG. 2, the inverter compressor (2A) constitutes the compression mechanism (2D) for the first channel, and the first non-inverter compressor (2B) and the second non-inverter compressor (2C) constitute the compression mechanism (2E) for the second channel. Only the first non-inverter compressor (2B) and the second non-inverter compressor (2C) in the compression mechanism (2E) for the second channel are driven.

As shown by the solid lines in FIG. 2, the first four-way selector valve (3A) and the second four-way selector valve (3B) are switched to be in the first state. The third four-way selector valve (3C) is switched to be in the second state. Further, the outdoor expansion valve (26), the electronic expansion valve (29) of the liquid injection pipe (27), the solenoid valve (7a) in the cold-storage unit (1C) and the solenoid valve (7b) in the freezing unit (1D) are closed.

Under this state, a refrigerant discharged from the first non-inverter compressor (2B) and the second non-inverter compressor (2C) flows from the first four-way selector valve (3A) through the outdoor gas pipe (9) into the outdoor heat exchanger (4) and is condensed therein. The condensed liquid refrigerant flows in the liquid pipe (10). Further, the liquid refrigerant flows through the receiver (14), the communication liquid pipe (11), the second branch pipe (11b) and the indoor expansion valve (42) into the indoor heat exchanger (41) and then is evaporated. The evaporated gas refrigerant flows from the communication gas pipe (17) through the first four-way selector valve (3A) and the second four-way selector valve (3B) into the suction pipe (6c) for the second non-inverter compressor (2C). A part of the low-pressure gas refrigerant returns to the second non-inverter compressor (2C). The remainder thereof flows from the suction pipe (6c) for the second non-inverter compressor (2C) into the branch pipe (6e). Then, the remaining gas refrigerant returns through the third four-way selector valve (3C) to the first non-inverter compressor (2B). By the refrigerant repeating such circulation, air-cooling within a store is performed.

Under this operational state, start and stop for the first non-inverter compressor (2B) and the second non-inverter compressor (2C) and the opening of the indoor expansion valve (42) are controlled depending on an air-cooling load within the store. Only one of the compressors (2B, 2C) may be operated.

<Freezing Operation>

Figure 3:
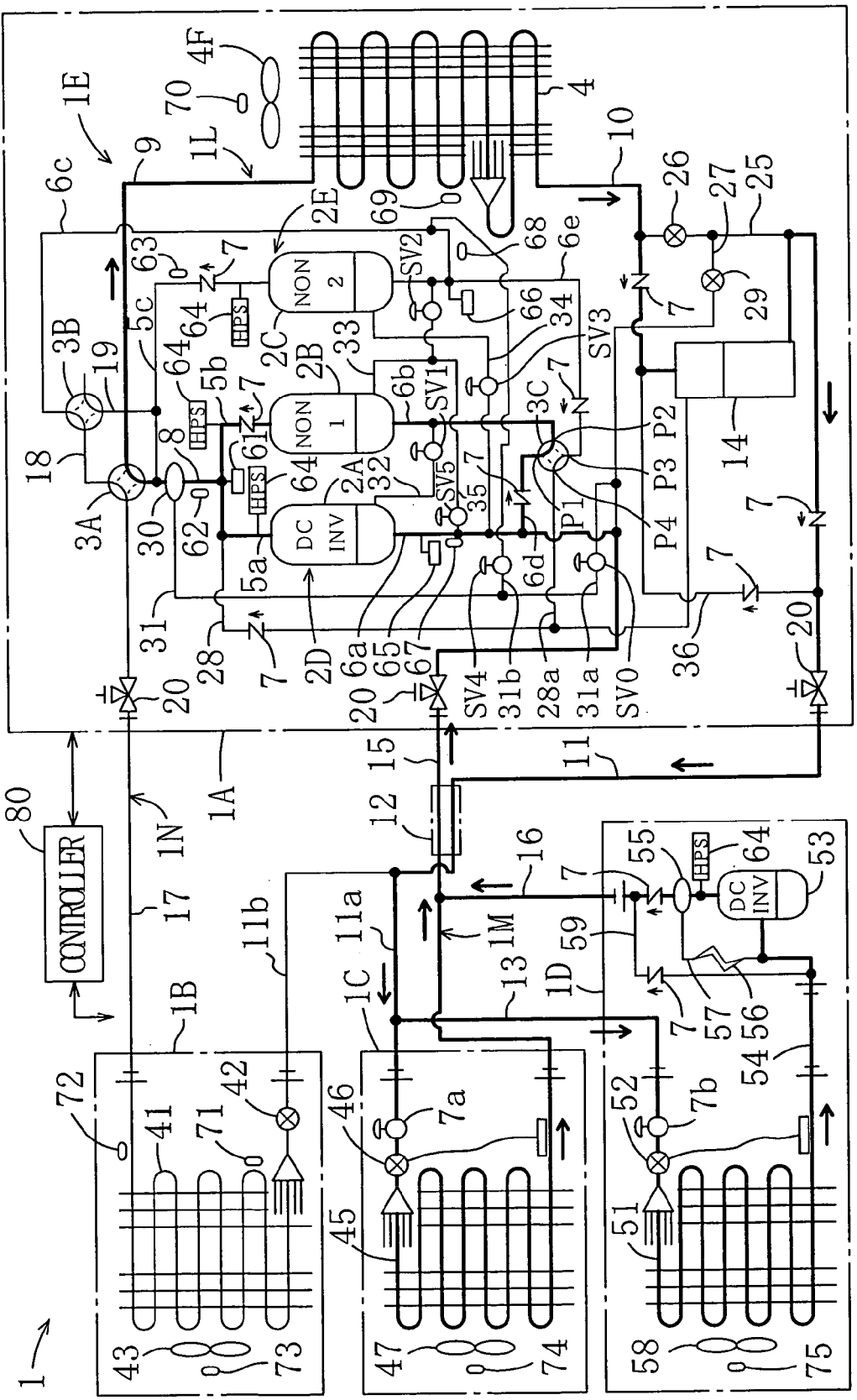
FIG. 3 is a refrigerant circuit diagram illustrating the operation of a freezing operation.

The freezing operation is an operation of performing only cooling in the cold-storage unit (1C) and the freezing unit (1D). During the freezing operation, as shown in FIG. 3, the inverter compressor (2A) and the first non-inverter compressor (2B) constitute the compression mechanism (2D) for the first channel, and the second non-inverter compressor (2C) constitutes the compression mechanism (2E) for the second channel. The inverter compressor (2A) and the first non-inverter compressor (2B) in the compression mechanism (2D) for the first channel are driven and the booster compressor (53) is also driven, but the second non-inverter compressor (2C) is stopped.

As shown by the solid lines in FIG. 3, the first four-way selector valve (3A) and the second four-way selector valve (3B) are switched to be in the first state, and the third four-way selector valve (3C) is also switched to be in the first state. The solenoid valve (7a) of the cold-storage unit (1C) and the solenoid valve (7b) of the freezing unit (1D) are opened, while the outdoor expansion valve (26) and the indoor expansion valve (42) are closed. The opening of the electronic expansion valve (29) of the liquid injection pipe (27) is adjusted to a predetermined value so as to enable a liquid refrigerant flow with a predetermined flow rate.

Under this state, a refrigerant discharged from the inverter compressor (2A) and the first non-inverter compressor (2B) flows from the first four-way selector valve (3A) through the outdoor gas pipe (9) into the outdoor heat exchanger (4) and then is condensed therein. The condensed liquid refrigerant flows through the liquid pipe (10), the receiver (14) and the communication liquid pipe (11) into the first branch pipe (11a). Then, a part of the condensed liquid refrigerant flows through the cold-storage expansion valve (46) into the cold-storage heat exchanger (45) and then is evaporated therein.

The other part of the liquid refrigerant flowing in the communication liquid pipe (11) flows through the branch liquid pipe (13) and the freezing expansion valve (52) into the freezing heat exchanger (51) and then is evaporated therein. The gas refrigerant evaporated in the freezing heat exchanger (51) is sucked by the booster compressor (53), compressed thereat and then discharged into the branch gas pipe (16).

The gas refrigerant evaporated by the cold-storage heat exchanger (45) joins the gas refrigerant discharged from the booster compressor (53) at the low-pressure gas pipe (15). The joined gas refrigerant returns to the inverter compressor (2A) and the first non-inverter compressor (2B). By the refrigerant repeating such circulation, cold-storage showcases and freezing showcases are cooled.

The refrigerant pressure of the freezing heat exchanger (51) is lower than that of the cold-storage heat exchanger (45) because the refrigerant is sucked by the booster compressor (53). As a result, the refrigerant temperature (evaporation temperature) in the freezing heat exchanger (51) is, e.g., −35° C., and the refrigerant temperature (evaporation temperature) in the cold-storage heat exchanger (45) is, e.g., −10° C.

During the freezing operation, start and stop for the first non-inverter compressor (2B) and start, stop and capacity control for the inverter compressor (2A) are performed depending on, e.g., a low refrigerant pressure (LP) detected by the low-pressure sensor (65), and the operation is performed depending on a freezing load.

For the control for increasing the capacity of the compression mechanism (2D), the inverter compressor (2A) is driven while the first non-inverter compressor (2B) is stopped. When the inverter compressor (2A) reaches its maximum capacity and then a load is further increased, the first non-inverter compressor (2B) is driven and the capacity of the inverter compressor (2A) is reduced to its minimum capacity. When a load is even further increased, the capacity of the inverter compressor (2A) is increased while the first non-inverter compressor (2B) is activated. For the control for reducing the capacity of the compressor, the operation opposite to the control for increasing the capacity is carried out.

A degree-of-superheat control utilizing a temperature sensing bulb is performed for the opening of the cold-storage expansion valve (46) and the freezing expansion valve (52). This is also performed in the following operations.

When a refrigerant is circulated in the refrigerant circuit (1E) during the freezing operation, a liquid refrigerant flowing in the communication liquid pipe (11) heat-exchanges with a low-pressure gas refrigerant flowing in the low-pressure gas pipe (15) and thus is supercooled. For this reason, the difference in enthalpy between refrigerants in the cold-storage heat exchanger (45) and the freezing heat exchanger (51) is larger than that of the case that supercooling is not performed. As a result, high refrigerating ability is exhibited.

The degree of superheat of a gas refrigerant at the suction side becomes large because it heat-exchanges with the liquid refrigerant. The gas refrigerant is mixed with the liquid refrigerant from the liquid injection pipe (27) and thus it is possible to prevent the degree of superheat of the gas refrigerant from becoming significantly large in the compression mechanism (2D).

<First Air-Cooling/Freezing Operation>

Figure 4:
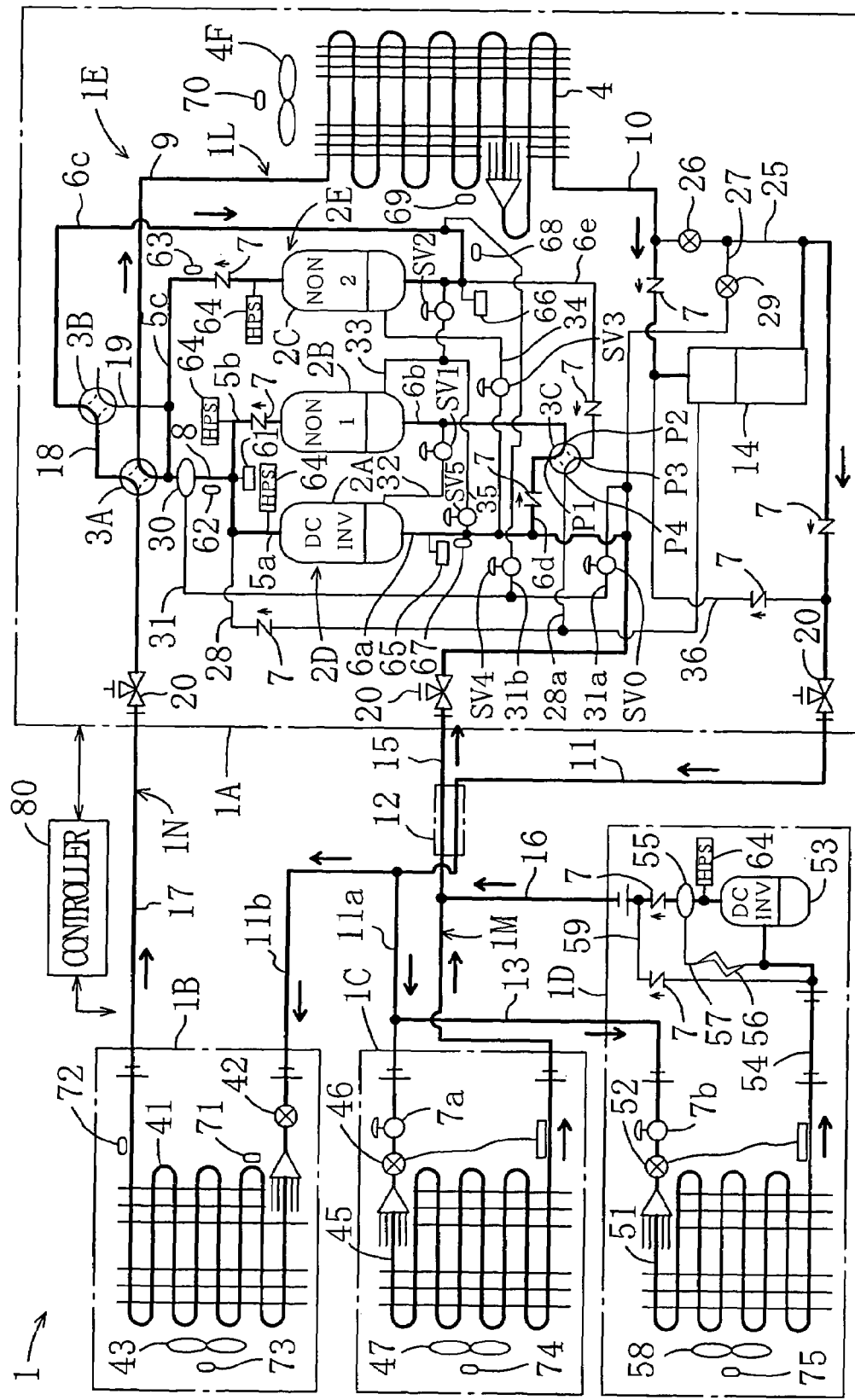
FIG. 4 is a refrigerant circuit diagram illustrating the operation of a first air-cooling/freezing operation.

This first air-cooling/freezing operation is an operation of simultaneously performing air-cooling in the indoor unit (1B) and cooling in the cold-storage unit (1C) and the freezing unit (1D). During the first air-cooling/freezing operation, as shown in FIG. 4, the inverter compressor (2A) and the first non-inverter compressor (2B) constitute the compression mechanism (2D) for the first channel, and the second non-inverter compressor (2C) constitutes the compression mechanism (2E) for the second channel. The inverter compressor (2A), the first non-inverter compressor (2B) and the second non-inverter compressor (2C) are driven, and the booster compressor (53) is also driven.

As shown by the solid lines in FIG. 4, the first four-way selector valve (3A), the second four-way selector valve (3B) and the third four-way selector valve (3C) are switched to be in the first state. The solenoid valve (7a) in the cold-storage unit (1C) and the solenoid valve (7b) in the freezing unit (1D) are opened, and the outdoor expansion valve (26) is closed. The opening of the electronic expansion valve (29) on the liquid injection pipe (27) is adjusted so as to supply a predetermined flow rate of liquid refrigerant to the suction side of the compression mechanism (2D).

Under this state, refrigerants discharged from the inverter compressor (2A), the first non-inverter compressor (2B) and the second non-inverter compressor (2C) join at the high-pressure gas pipe (8). The resultant joined refrigerant flows from the first four-way selector valve (3A) through the outdoor gas pipe (9) into the outdoor heat exchanger (4), and then is condensed therein. The condensed refrigerant flows through the liquid pipe (10) and the receiver (14), and then into the communication liquid pipe (11).

A part of the liquid refrigerant flowing in the communication liquid pipe (11) is branched into the second branch pipe (11b). The branched liquid refrigerant flows through the indoor expansion valve (42) into the indoor heat exchanger (41), and then is evaporated therein. The evaporated gas refrigerant flows from the communication gas pipe (17) through the first four-way selector valve (3A) and the second four-way selector valve (3B) into the suction pipe (6c). Finally, the evaporated gas refrigerant returns to the second non-inverter compressor (2C).

The other part of the liquid refrigerant flowing in the communication liquid pipe (11) is branched into the first branch pipe (11a). A part of the branched liquid refrigerant flows through the cold-storage expansion valve (46) into the cold-storage heat exchanger (45) and then is evaporated therein. The other part of the liquid refrigerant flowing in the first branch pipe (11a) flows through the branch liquid pipe

(13) and the freezing expansion valve (52) into the freezing heat exchanger (51) and then is evaporated therein. The gas refrigerant evaporated by the freezing heat exchanger (51) is sucked by the booster compressor (53), compressed therein and then discharged into the branch gas pipe (16).

The gas refrigerant evaporated by the cold-storage heat exchanger (45) joins the gas refrigerant discharged from the booster compressor (53) at the low-pressure gas pipe (15) and the joined gas refrigerant returns to the inverter compressor (2A) and the first non-inverter compressor (2B).

By the refrigerant repeating such circulation, air-cooling within a store is performed and the interiors of cold-storage showcases and freezing showcases are cooled.

Figure 5:
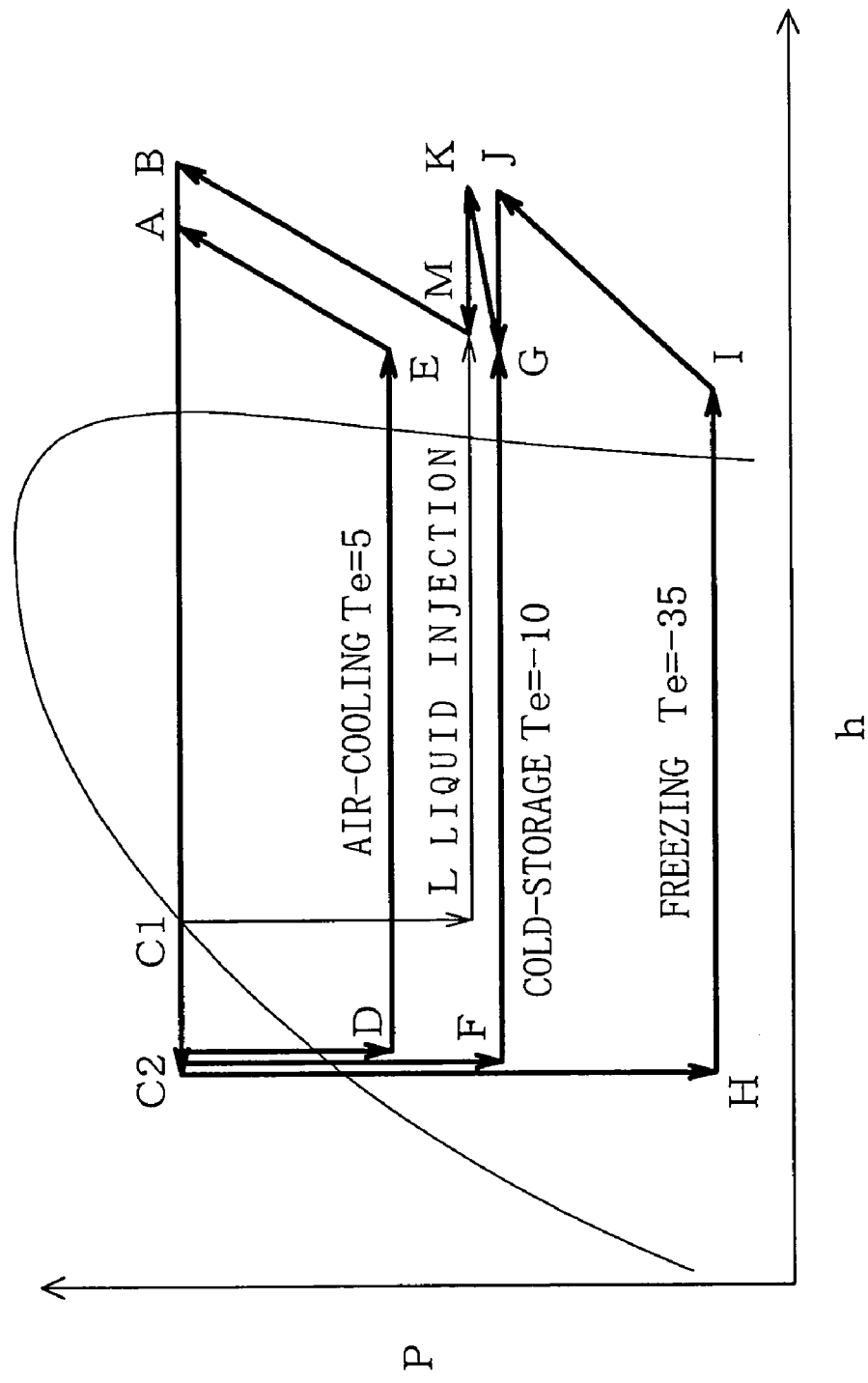
FIG. 5 is a Mollier chart illustrating the behavior of a refrigerant at the time of the first air-cooling/freezing operation.

The behavior of refrigerant during the first air-cooling/freezing operation will be described based on a Mollier chart shown in FIG. 5.

Firstly, a refrigerant is compressed to a point A by the second non-inverter compressor (2C). A refrigerant is compressed to a point B by the inverter compressor (2A) and the first non-inverter compressor (2B). The refrigerant at the point A joins the refrigerant at the point B, and the joined refrigerant is condensed into a point C1. The refrigerant at the point C1 heat-exchanges with a gas refrigerant sucked into the inverter compressor (2A) and the first non-inverter compressor (2B) so as to be in a supercooled state (point C2).

The pressure of a part of the refrigerant at the point C2 is reduced to a point D by the indoor expansion valve (42). This refrigerant is evaporated at, e.g., +5° C. and sucked into the second non-inverter compressor (2C) at a point E.

The pressure of a part of the refrigerant at the point C2 is reduced to a point F by the cold-storage expansion valve (46). This refrigerant is evaporated at, e.g., −10° C. and its state is changed to a point G.

Because a part of the refrigerant at the point C2 is sucked by the booster compressor (53), the pressure of this refrigerant is reduced to a point H by the freezing expansion valve (52). This refrigerant is evaporated at, e.g., −35° C. and sucked by the booster compressor (53) at a point I. The refrigerant compressed to a point J by the booster compressor (53) joins the refrigerant from the cold-storage heat exchanger (45) and the state of the resultant joined refrigerant is changed to the point G.

The gas refrigerant at the point G heat-exchanges with the liquid refrigerant at the point C1 and is superheated to a point K. The liquid refrigerant is supercooled to the point C2. The state of the gas refrigerant is changed to a point M by mixing this gas refrigerant with a refrigerant obtained by reducing the pressure of a part of the liquid refrigerant at the point C1 to a point L by the electronic expansion valve (29) (by performing liquid injection), and then the resultant refrigerant is sucked by the inverter compressor (2A) and the first non-inverter compressor (2B).

As described above, the refrigerant in the refrigerant circuit (1E) is evaporated at different temperatures by the compression mechanism (2D) for the first channel and the compression mechanism (2E) for the second channel. Further, the refrigerant is compressed by two steps by the booster compressor (53) and thus has three kinds of evaporation temperatures.

When the refrigerant is circulated during the first air-cooling/freezing operation, a liquid refrigerant flowing in the communication liquid pipe (11) heat-exchanges with a low-pressure gas refrigerant flowing in the low-pressure gas pipe (15) and thus is supercooled. For this reason, the differences in enthalpy of refrigerants in the air-conditioning heat exchanger (41), the cold-storage heat exchanger (45) and the freezing heat exchanger (51) are larger than those of the case that supercooling is not performed. As a result, high refrigerating ability is exhibited.

The gas refrigerant at the suction side is mixed with the liquid refrigerant by performing liquid injection and thus the degree of superheat of the refrigerant cannot be excessively large in the compression process.

<Second Air-Cooling/Freezing Operation>

Figure 6:
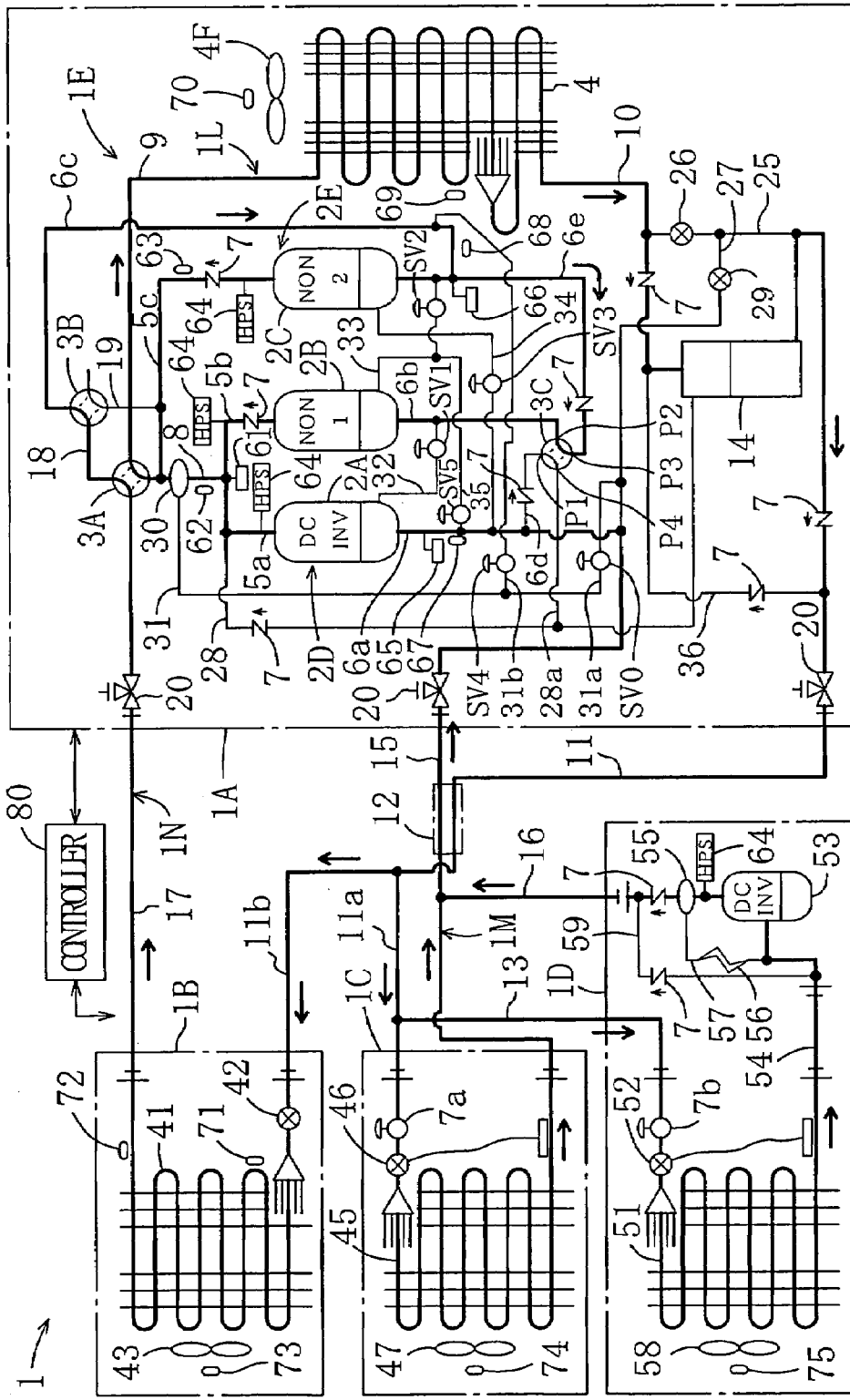
FIG. 6 is a refrigerant circuit diagram illustrating the operation of a second air-cooling/freezing operation.

The second air-cooling/freezing operation is an operation performed when the air-cooling ability of the indoor unit (1B) becomes insufficient during the first air-cooling/freezing operation and in which the first non-inverter compressor (2B) is switched to the air-conditioning side. Settings for the second air-cooling/freezing operation are basically the same as in the first air-cooling/freezing operation as shown in FIG. 6. Nevertheless, the second air-cooling/freezing operation is different from the first air-cooling/freezing operation in that the third four-way selector valve (3C) is switched to be in the second state.

In accordance with the second air-cooling/freezing operation, as in the first air-cooling/freezing operation, a refrigerant discharged from the inverter compressor (2A), the first non-inverter compressor (2B) and the second non-inverter compressor (2C) is condensed in the outdoor heat exchanger (4) and then is evaporated in the indoor heat exchanger (41), the cold-storage heat exchanger (45) and the freezing heat exchanger (51).

The refrigerant evaporated in the indoor heat exchanger (41) returns to the first non-inverter compressor (2B) and the second non-inverter compressor (2C). The refrigerant evaporated in the cold-storage heat exchanger (45) and the freezing heat exchanger (51) returns to the inverter compressor (2A). Because two compressors (2B, 2C) are used at the air-conditioning side, the lack of the air-cooling ability is compensated.

A description about specific switching control between the first air-cooling/freezing operation and the second air-cooling/freezing operation will be omitted.

In the second air-cooling/freezing operation, an improvement in ability can be accomplished by supercooling a liquid refrigerant.

<Air-Heating Operation>

Figure 7:
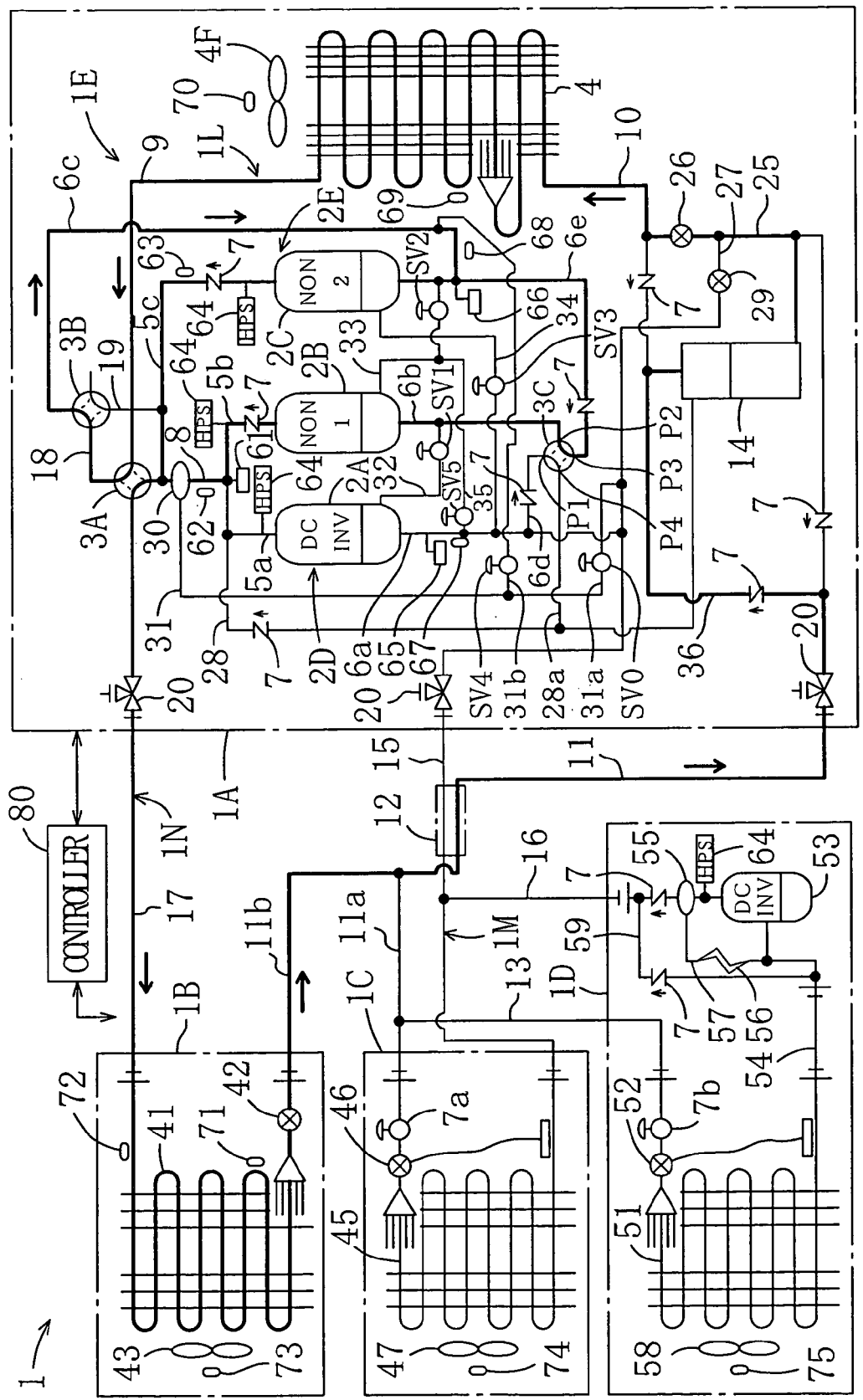
FIG. 7 is a refrigerant circuit diagram illustrating the operation of an air-heating operation.

The air-heating operation is an operation of performing only air-heating in the indoor unit (1B). At the time of the air-heating operation, as shown in FIG. 7, the inverter compressor (2A) constitutes the compression mechanism (2D) for the first channel, and the first non-inverter compressor (2B) and the second non-inverter compressor (2C) constitute the compression mechanism (2E) for the second channel. Only the first non-inverter compressor (2B) and the second non-inverter compressor (2C) in the compression mechanism (2E) for the second channel are driven.

As shown by the solid lines in FIG. 7, the first four-way selector valve (3A) is switched to be in the second state, the second four-way selector valve (3B) is switched to be in the first state and the third four-way selector valve (3C) is switched to be in the second state. The electronic expansion valve (29) on the liquid injection pipe (27), solenoid valve (7a) in the cold-storage unit (1C) and the solenoid valve (7b) in the freezing unit (1D) are closed. Openings of the outdoor expansion valve (26) and the indoor expansion valve (42) are controlled to predetermined values.

Under this state, a refrigerant discharged from the first non-inverter compressor (2B) and the second non-inverter compressor (2C) flows from the first four-way selector valve (3A) through the communication gas pipe (17) into the indoor heat exchanger (41) and then is condensed therein. The condensed liquid refrigerant flows through the communication liquid pipe (11) and the branch liquid pipe (36) into the receiver (14). Then, the liquid refrigerant flows through the outdoor expansion valve (26) on the auxiliary liquid pipe (25) into the outdoor heat exchanger (4), and then is evaporated therein. The evaporated gas refrigerant flows from the outdoor gas pipe (9) through the first four-way selector valve (3A) and the second four-way selector valve (3B) into the suction pipe (6c) for the second non-inverter compressor (2C). Finally, the evaporated gas refrigerant returns to the first non-inverter compressor (2B) and the second non-inverter compressor (2C). By repeating such circulation, air-heating within a store is performed.

As in the air-cooling operation, one of the compressors (2A, 2B) may be operated.

<First Air-Heating/Freezing Operation>

Figure 8:
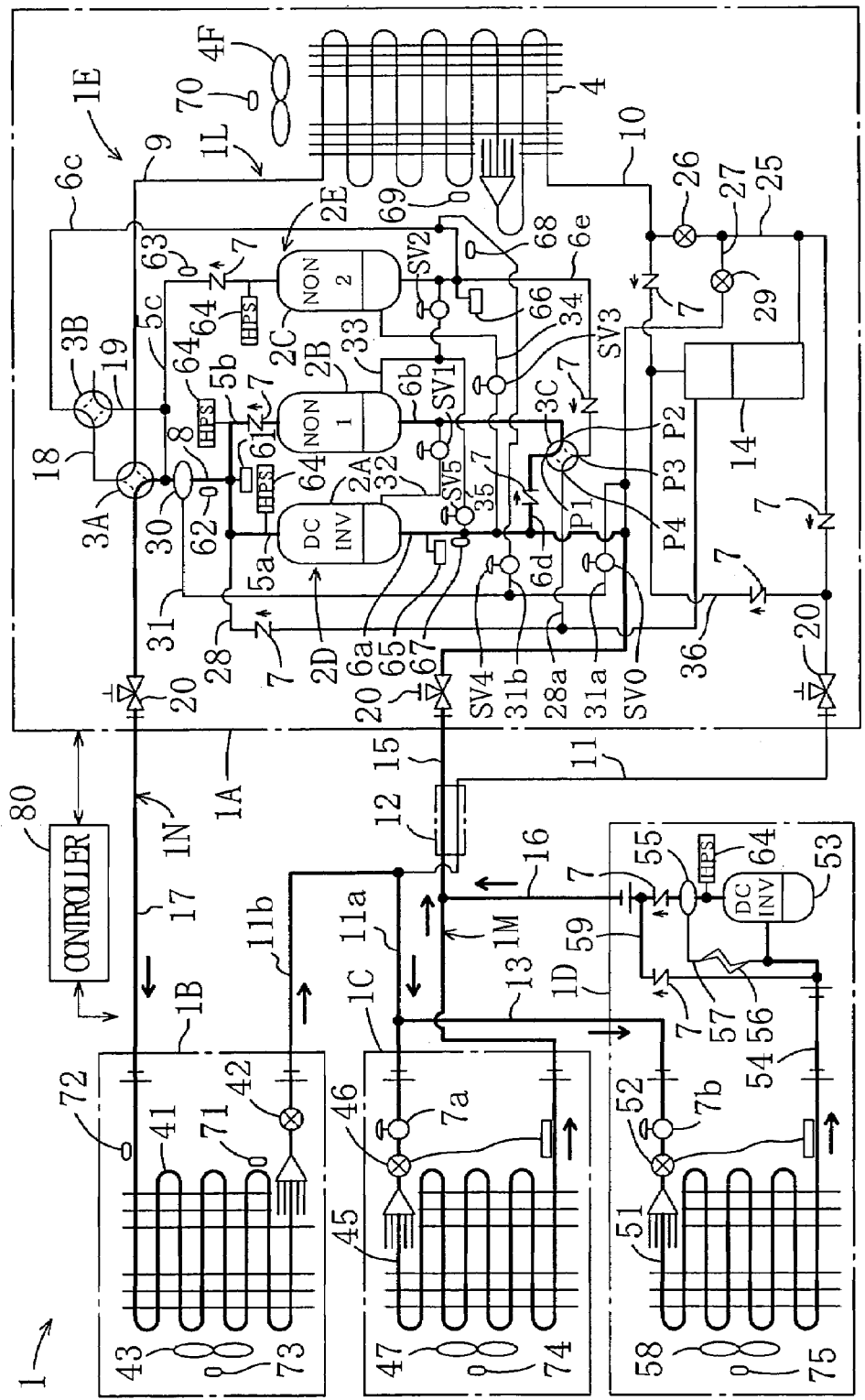
FIG. 8 is a refrigerant circuit diagram illustrating the operation of a first air-heating/freezing operation.

The first air-heating/freezing operation is a heat recovery operation of performing air-heating in the indoor unit (1B) and cooling in the cold-storage unit (1C) and the freezing unit (1D) without using the outdoor heat exchanger (4). In accordance with the first air-heating/freezing operation, as shown in FIG. 8, the inverter compressor (2A) and the first non-inverter compressor (2B) constitute the compression mechanism (2D) for the first channel, and the second non-inverter compressor (2C) constitutes the compression mechanism (2E) for the second channel. The inverter compressor (2A) and the first non-inverter compressor (2B) are driven and the booster (53) is also driven. The second non-inverter compressor (2C) is stopped.

As shown by the solid lines in FIG. 8, the first four-way selector valve (3A) is switched to be in the second state, the second four-way selector valve (3B) and the third four-way selector valve (3C) are switched to be in the first state. The solenoid valve (7a) in the cold-storage unit (1C) and the solenoid valve (7b) in the freezing unit (1D) are opened, and the outdoor expansion valve (26) is closed. The opening of the electronic expansion valve (29) on the liquid injection pipe (27) is controlled to a predetermined value in order to adjust the flow rate of a refrigerant.

Under this state, a refrigerant discharged from the inverter compressor (2A) and the first non-inverter compressor (2B) flows from the first four-way selector valve (3A) through the communication gas pipe (17) into the indoor heat exchanger (41) and then is condensed therein. The condensed liquid refrigerant flows from the second branch pipe (11b) to the first branch pipe (11a) before the communication liquid pipe (11).

A part of the liquid refrigerant flowing in the first branch pipe (11a) flows through the cold-storage expansion valve (46) into the cold-storage heat exchanger (45) and then is evaporated therein. The other part of the liquid refrigerant flowing in the first branch pipe (11a) flows through the branch liquid pipe (13) and the freezing expansion valve (52) into the freezing heat exchanger (51) and then is evaporated therein. The gas refrigerant evaporated by the freezing heat exchanger (51) is sucked by the booster compressor (53), compressed thereby and discharged into the branch gas pipe (16).

The gas refrigerant evaporated in the cold-storage heat exchanger (45) joins the gas refrigerant discharged from the booster compressor (53) at the low-pressure gas pipe (15). The joined gas refrigerant returns to the inverter compressor (2A) and the first non-inverter compressor (2B). By the refrigerant repeating such circulation, air-heating within a store is performed, and the interiors of cold-storage showcases and freezing showcases are cooled. During the first air-heating/freezing operation, a cooling ability (amount of heat evaporated) for the cold-storage unit (1C) and the freezing unit (1D) is balanced with an air-heating ability (amount of heat condensed) for the indoor unit (1B), so that 100% of heat is recovered.

If the amount of the liquid refrigerant flowing from the second branch pipe (11b) to the first branch pipe (11a) is insufficient, the liquid refrigerant is sucked from the receiver (14) through the communication liquid pipe (11) into the first branch pipe (11a). The liquid refrigerant is supercooled by a low-pressure gas refrigerant at the portion that the communication liquid pipe (11) and the low-pressure gas pipe (15) are provided adjacent to each other, and the resultant supercooled refrigerant flows toward the cold-storage heat exchanger (45) and the freezing heat exchanger (51). Accordingly, even if a part of the liquid refrigerant from the second branch pipe (11b) to the first branch pipe (11a) is flashed, a flash gas is condensed into a liquid and then the liquid is supplied to the heat exchangers (45, 51).

<Second Air-Heating/Freezing Operation>

Figure 9:
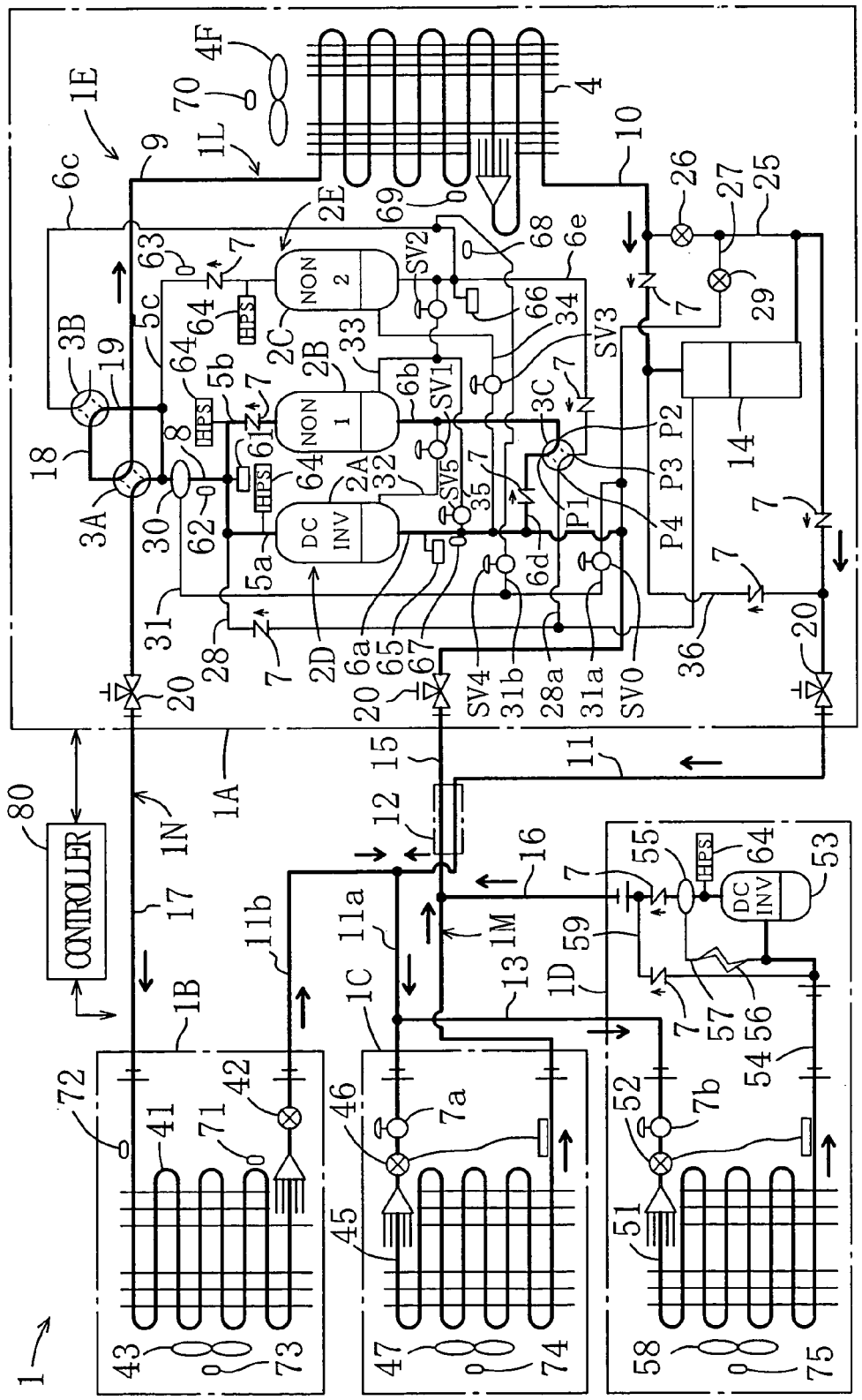
FIG. 9 is a refrigerant circuit diagram illustrating the operation of a second air-heating/freezing operation.

The second air-heating/freezing operation is an operation with excess air-heating ability in which during the first air-heating/freezing operation, the air-heating ability for the indoor unit (1B) is superfluous. During the second air-heating/freezing operation, as shown in FIG. 9, the inverter compressor (2A) and the first non-inverter compressor (2B) constitute the compression mechanism (2D) for the first channel, and the second non-inverter compressor (2C) constitutes the compression mechanism (2E) for the second channel. The inverter compressor (2A), the first non-inverter compressor (2B) and the booster compressor (53) are driven. The second non-inverter compressor (2C) is stopped.

The second air-heating/freezing operation is an operation in which the air-heating ability is superfluous during the first air-heating/freezing operation, and is the same as the first air-heating/freezing operation except that the second four-way selector valve (3B) is switched to be in the second state as shown by the solid lines in FIG. 9.

A part of refrigerant discharged from the inverter compressor (2A) and the first non-inverter compressor (2B) flows in the indoor heat exchanger (41) and then is condensed therein as in the first air-heating/freezing operation. The condensed liquid refrigerant flows from the second branch pipe (11b) to the first branch pipe (11a) before the communication liquid pipe (11).

The other part of the refrigerant discharged from the inverter compressor (2A) and the first non-inverter compressor (2B) flows from the auxiliary gas pipe (19) through the second four-way selector valve (3B) and the first four-way selector valve (3A) to the outdoor gas pipe (9). Then, the refrigerant is condensed in the outdoor heat exchanger (4). The condensed liquid refrigerant passes through the receiver (14) when flowing in the liquid pipe (10). Further, the liquid refrigerant flows through the communication liquid pipe (11) into the first branch pipe (11a), and joins the refrigerant from the second branch pipe (11b).

A part of the liquid refrigerant flowing in the first branch pipe (11a) flows in the cold-storage heat exchanger (45) and is evaporated therein. The other part of the liquid refrigerant flowing in the first branch pipe (11a) flows in the freezing heat exchanger (51), is evaporated and sucked into the booster compressor (53). The gas refrigerant evaporated in the cold-storage heat exchanger (45) joins the gas refrigerant discharged from the booster compressor (53) at the low-pressure gas pipe (15). The joined refrigerant returns to the inverter compressor (2A) and the first non-inverter compressor (2B).

While the suction side gas refrigerant flows in the low-pressure gas pipe (15), it heat-exchanges with the liquid refrigerant flowing in the communication liquid pipe (11) and thus the liquid refrigerant flowing in the communication liquid pipe (11) is supercooled. This liquid refrigerant joins the liquid refrigerant from the second branch pipe (11b) and the joined liquid refrigerant flows in the cold-storage heat exchanger (45) and the freezing heat exchanger (51). Accordingly, the differences in enthalpy of the refrigerants in the cold-storage heat exchanger (45) and the freezing heat exchanger (51) become larger than those of the case in which supercooling is not performed, so that high refrigerating ability is exhibited. Although the gas refrigerant is superheated because of heat-exchange with the liquid refrigerant, it is mixed with the liquid refrigerant by liquid injection. Thus, it is possible to prevent the degree of superheat of the gas refrigerant from being excessively large in a compression process.

Figure 10:
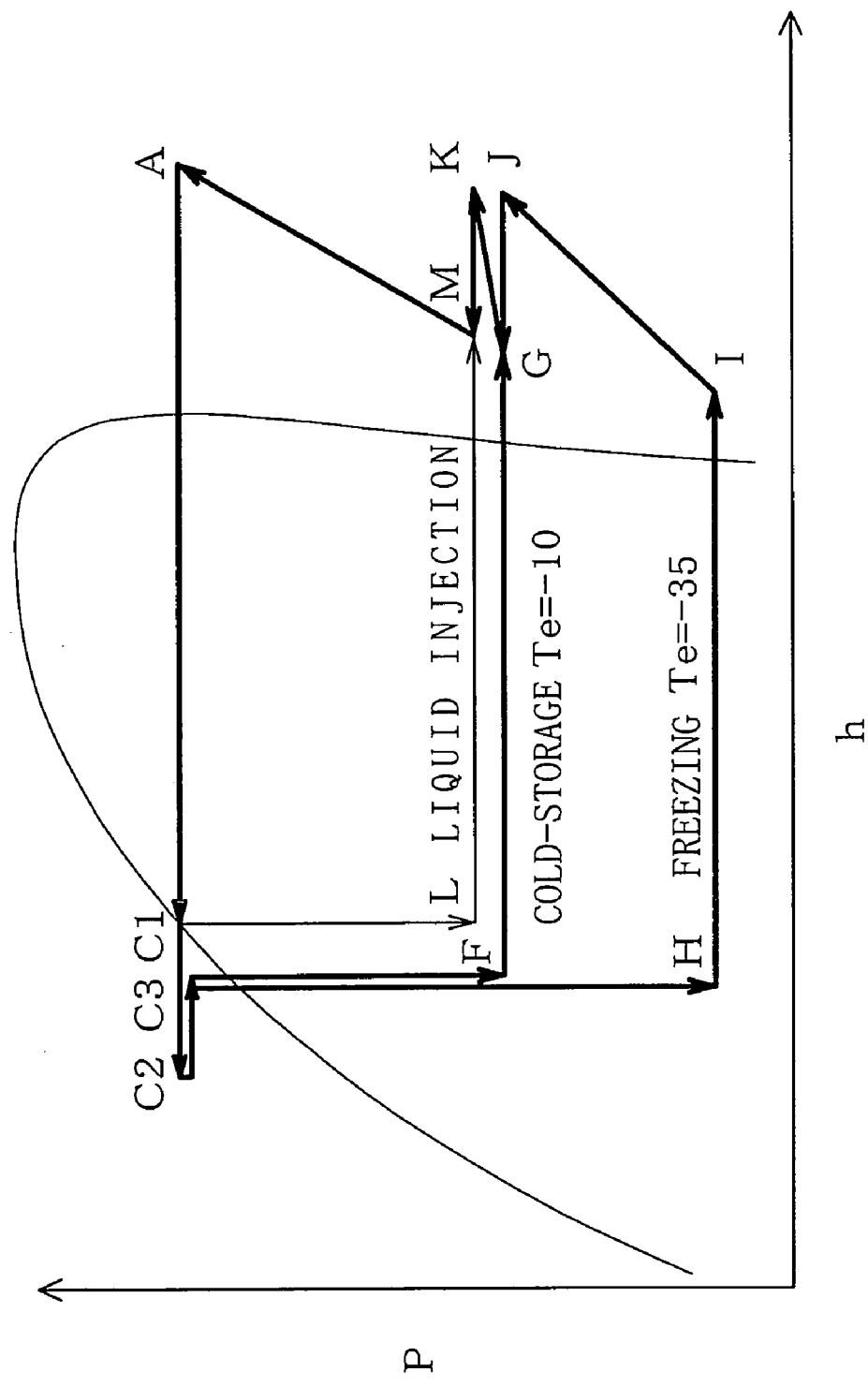
FIG. 10 is a Mollier chart illustrating the behavior of a refrigerant at the time of the second air-heating/freezing operation.

The behavior of refrigerant during the second air-heating/freezing operation will be described based on a Mollier chart shown in FIG. 10.

A refrigerant is compressed to a point A by the inverter compressor (2A) and the first non-inverter compressor (2B). A part of the refrigerant at the point A is condensed by the indoor heat exchanger (41) to a point C1. The other part of the refrigerant at the point A is condensed by the outdoor heat exchanger (4) to the point Cl, and then heat-exchanges with the gas refrigerant (refrigerant at a point G) sucked into the inverter compressor (2A) and the first non-inverter compressor (2B) during its flowing in the communication liquid pipe (11) in order to be supercooled to a point C2.

The refrigerant at the point C1 joins the refrigerant at the point C2 and the joined refrigerant is changed to a point C3. The pressure of a part of the refrigerant at the point C3 is reduced to a point F by the cold-storage expansion valve (46). Then, this refrigerant is evaporated at, e.g., −10° C. and its state is changed to the point G.

A part of the refrigerant at the point C3 is sucked by the booster compressor (53). Thus, the pressure of this refrigerant is reduced to a point H at the freezing expansion valves (52). Further, this refrigerant is evaporated at, e.g., −35° C. and sucked into the booster compressor (53) at a point I. The refrigerant compressed by the booster compressor (53) to a point J joins the refrigerant from the cold-storage heat exchanger (45) and the state of the joined refrigerant is changed to the point G.

The gas refrigerant at the point G heat-exchanges with the liquid refrigerant at the point C1 to be superheated to a point K. The liquid refrigerant is supercooled to the point C2. This gas refrigerant is mixed with a refrigerant obtained by reducing the pressure of a part of the liquid refrigerant at the point C1 to the point L by the electronic expansion valve (29) (by performing liquid injection), so that its state is changed to a point M. Thereafter, the resultant gas refrigerant is sucked by the inverter compressor (2A) and the first inverter compressor (2B).

By repeating such circulation during the second air-heating/freezing operation, air-heating within a store is performed and the interiors of cold-storage showcases and freezing showcases are cooled. At this time, the cooling ability (amount of heat evaporated) for the cold-storage unit (1C) and the freezing unit (1D) is not balanced with the air-heating ability (amount of heat condensed) for the indoor unit (1B), and excess condensed heat is discharged outdoor by the outdoor heat exchanger (4).

<Third Air-Heating/Freezing Operation>

Figure 11:
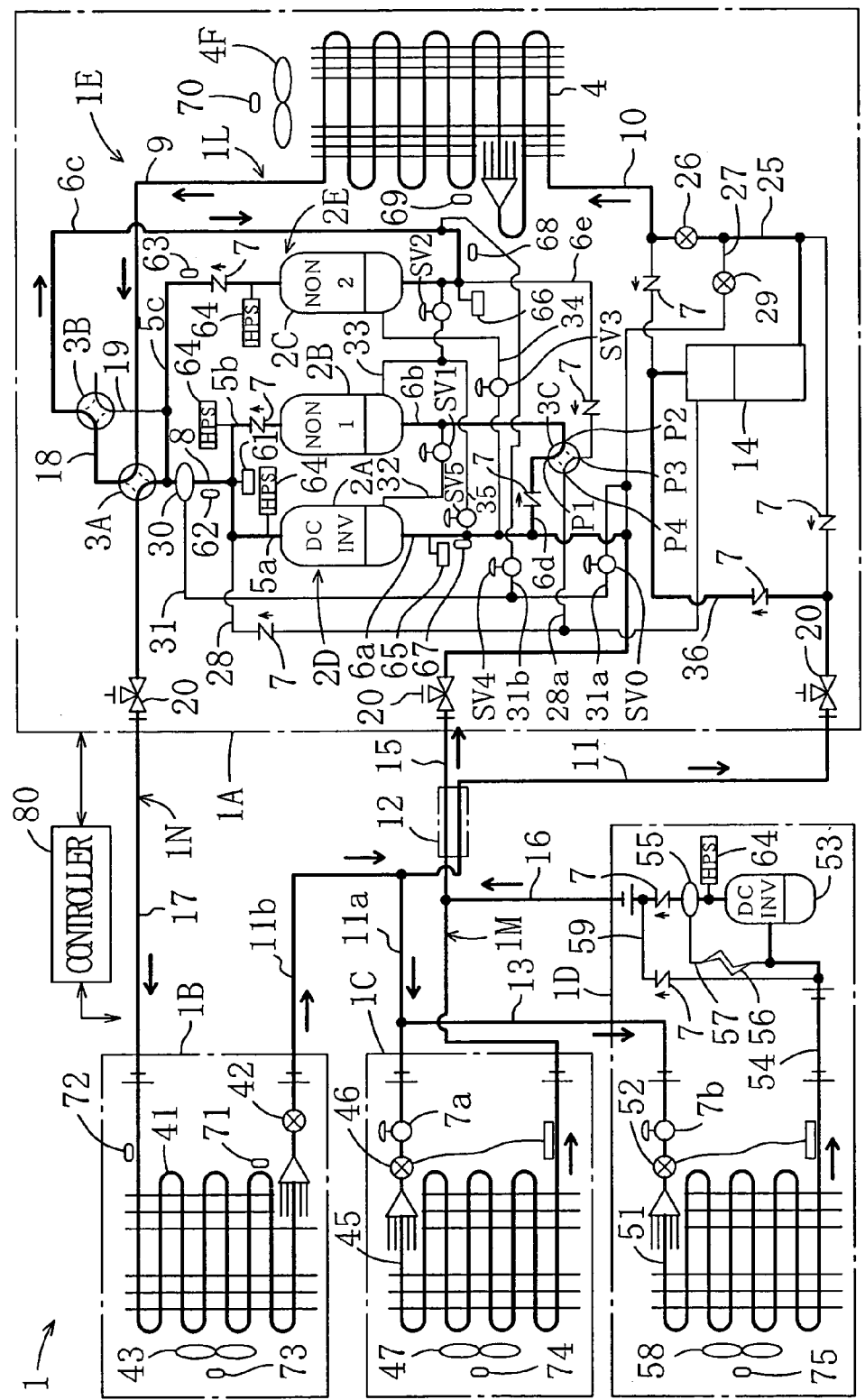
FIG. 11 is a refrigerant circuit diagram illustrating the operation of a third air-heating/freezing operation.

The third air-heating/freezing operation is an operation with insufficient air-heating ability in which during the first air-heating/freezing operation, the air-heating ability for the indoor unit (1B) is insufficient. In accordance with the third air-heating/freezing operation, as shown in FIG. 11, the inverter compressor (2A) and the first non-inverter compressor (2B) constitute the compression mechanism (2D) for the first channel, and the second non-inverter compressor (2C) constitutes the compression mechanism (2E) for the second channel. The inverter compressor (2A), the first non-inverter compressor (2B) and the second non-inverter compressor (2C) are driven. Further, the booster compressor (53) is also driven.

The third air-heating/freezing operation is performed when the air-heating ability is insufficient in the first air-heating/freezing operation, i.e., is performed when an amount of heat evaporated is insufficient. The third air-heating/freezing operation is the same as the first air-heating/freezing operation except that the opening of the outdoor expansion valve (26) is controlled and the second non-inverter compressor (2C) is driven.

A refrigerant discharged from the inverter compressor (2A), the first non-inverter compressor (2B) and the second non-inverter compressor (2C) flows through the communication gas pipe (17) into the indoor heat exchanger (41) and then is condensed therein, as in the first air-heating/freezing operation. The condensed liquid refrigerant is branched from the second branch pipe ( lb) into the first branch pipe (11a) and the communication liquid pipe (11).

A part of the liquid refrigerant flowing in the first branch pipe (11a) flows in the cold-storage heat exchanger (45) and is evaporated therein. The other part of the liquid refrigerant flowing in the first branch pipe (11a) flows in the freezing heat exchanger (51), is evaporated therein, and sucked into the booster compressor (53). The gas refrigerant evaporated by the cold-storage heat exchanger (45) joins the gas refrigerant discharged from the booster compressor (53) at the low-pressure gas pipe (15), and the joined gas refrigerant returns to the inverter compressor (2A) and the first non-inverter compressor (2B).

The liquid refrigerant which is condensed in the indoor heat exchanger (41) and then flows in the communication liquid pipe (11) flows from the branch liquid pipe (36) through the receiver (14) and the outdoor expansion valve (26) to the outdoor heat exchanger (4), and then is evaporated therein. The evaporated gas refrigerant flows in the outdoor gas pipe (9). Further, the evaporated gas refrigerant flows through the first four-way selector valve (3A) and the second four-way selector valve (3B) into the suction pipe (6c) for the second non-inverter compressor (2C) and then returns to the second non-inverter compressor (2C).

Figure 12:
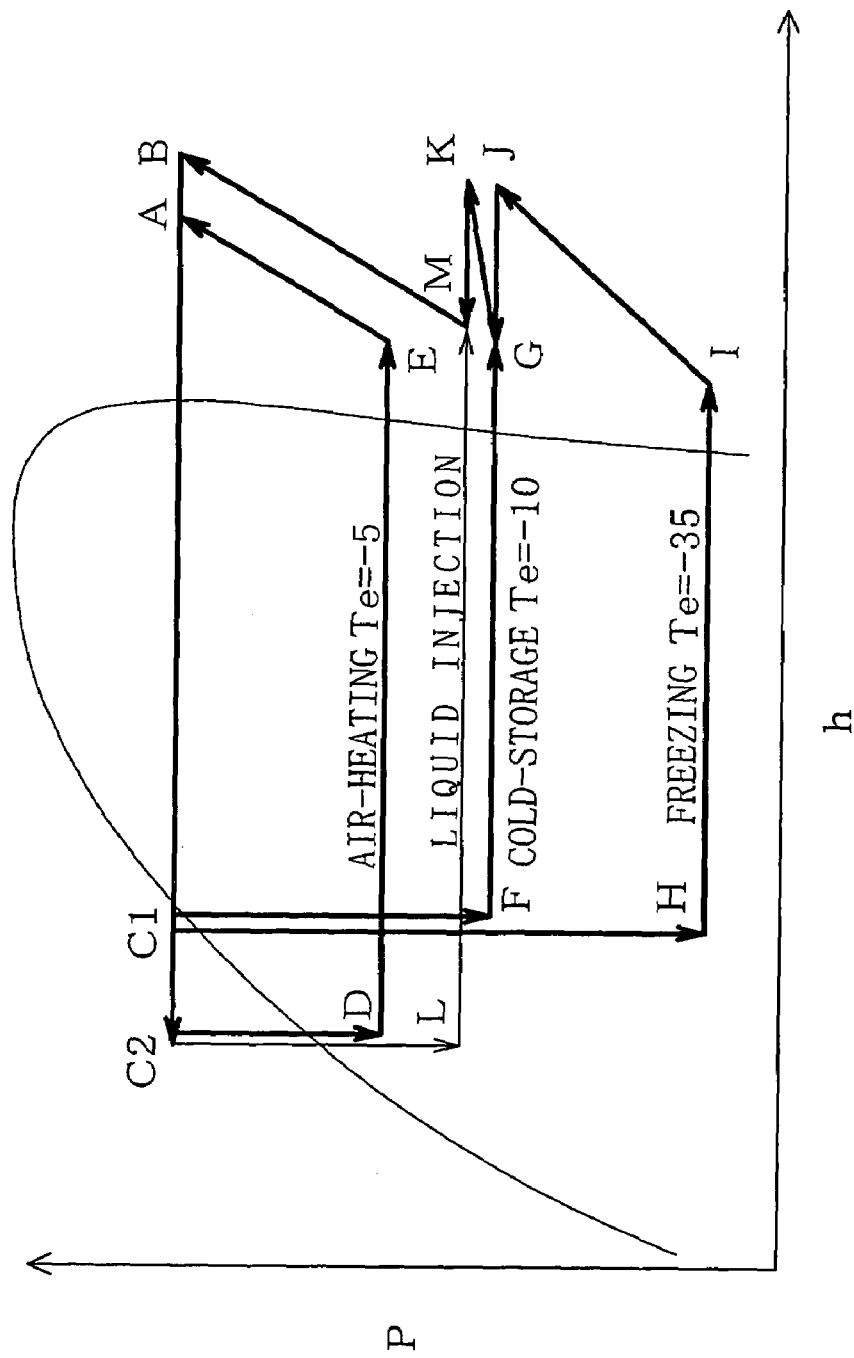
FIG. 12 is a Mollier chart illustrating the behavior of a refrigerant at the time of the third air-heating/freezing operation.

The behavior of refrigerant during the third air-heating/freezing operation will be described based on a Mollier chart shown in FIG. 12.

A refrigerant is compressed to a point A by the second non-inverter compressor (2C). A refrigerant is compressed to a point B by the inverter compressor (2A) and the first non-inverter compressor (2B). The refrigerant at the point A joins the refrigerant at the point B, and the joined refrigerant is condensed to a point C1 by the indoor heat exchanger (41).

The pressure of a part of the refrigerant at the point C1 is reduced to a point F by the cold-storage expansion valve (46). Then, this refrigerant is evaporated at, e.g., −10° C. and its state is changed to a point G. A part of the refrigerant at the point C1 is sucked by the booster compressor (53). Thus, the pressure of this refrigerant is reduced to a point H by the freezing expansion valve (52). This refrigerant is evaporated at, e.g., −35° C. and sucked into the booster compressor (53) at a point I. The refrigerant compressed by the booster compressor (53) to a point J joins the refrigerant from the cold-storage heat exchanger (45) and the state of the joined refrigerant is changed to the point G.

The gas refrigerant at the point G heat-exchanges with the liquid refrigerant at the point C1 flowing from the indoor heat exchanger (41) in the communication pipe (11). The liquid refrigerant flowing in the communication pipe (11) is supercooled to the point C2. The gas refrigerant flowing in the low-pressure gas pipe (15) is superheated to a point K.

The pressure of the refrigerant at the point C2 is reduced to a point D by the outdoor expansion valve (26). This refrigerant is evaporated at, e.g., −5° C. and sucked to the second inverter compressor (2C) at a point E.

The gas refrigerant at the point K is mixed with a refrigerant obtained by reducing the pressure of the liquid refrigerant at the point C2 to the point L by the electronic expansion valve (29), so that its state is changed to a point M. Thereafter, the resultant refrigerant at the point M is sucked by the inverter compressor (2A) and the first inverter compressor (2B).

By repeating such circulation, air-heating within a store is performed and the interiors of cold-storage showcases and freezing showcases are cooled. Namely, the cooling ability (amount of heat evaporated) for the cold-storage unit (1C) and the freezing unit (1D) is not balanced with the air-heating ability (amount of heat condensed) for the indoor unit (1B), and insufficient evaporated heat is obtained from the outdoor heat exchanger (4).

Effects of Embodiment

In accordance with this embodiment, the liquid line for cold-storage/freezing channel and the liquid line for the air-conditioning channel share one communication liquid pipe (11), and the communication liquid pipe (11) is provided adjacent to the low-pressure gas pipe (15) serving as a gas line for the cold-storage/freezing channel so as to contact it. Thus, a liquid refrigerant is supercooled by a low-pressure gas refrigerant, so that a refrigerant having lower enthalpy can be supplied to the application-side heat exchangers (41, 45, 51). Consequently, the differences in enthalpy between refrigerants at entrances/exits of the respective application-side heat exchangers (41, 45, 51) become large, and a decrease in refrigerating ability can be prevented even if pipes are long.

As liquid lines for a plurality of channels are integrated into one communication liquid pipe (11), the total number of communication pipes is reduced. Accordingly, work for connecting pipes is easily performed and the possibility of connecting wrong pipes may be reduced.

Further, there is provided the liquid injection pipe (27) for supplying a part of liquid refrigerant circulating in the refrigerant circuit (1E) to the suction sides of the compression mechanisms (2D, 2E). Accordingly, even if the degree of superheat of gas refrigerant at the suction side becomes large when a liquid refrigerant is supercooled by the gas refrigerant, liquid injection can prevent the degree of superheat of the refrigerant from being excessively large in a compression step.

The aluminum tape material (12) serving as a heat transfer material is wound around the communication liquid pipe (11) and the low-pressure gas pipe (15) so that the pipes (11, 15) are surrounded by the heat transfer material (12). Thus, a liquid refrigerant can be reliably supercooled by a gas refrigerant through the heat transfer material (12). In accordance with such a structure, a heat exchanger dedicated to supercooling of liquid refrigerant is not required and thus the structure is not complicated.

Other Embodiments

The present invention may be structured as follows with respect to the above-described embodiment.

For example, the refrigerating apparatus (1) which has the cold-storage/freezing channel and the air-conditioning channel capable of performing air-cooling/air-heating has been described in the above embodiment. Nevertheless, the present invention may be applied to apparatus having a cold-storage/freezing channel and an air-conditioning channel dedicated to air-cooling or apparatus having a plurality of cold-storage/freezing channels. In such cases, gas lines are not switched between a low-pressure side and a high-pressure side in both of the channels. Thus, gas lines, as well as liquid lines, may be integrated.

Specific structure of the application-side or the heat-source side may be appropriately changed. Namely, in accordance with the present invention, the structure only has to be such that a liquid refrigerant in a liquid side communication pipe can be supercooled by a low-pressure gas refrigerant in a low-pressure gas side communication pipe.

INDUSTRIAL APPLICABILITY

As described above, the present invention is useful for a refrigerating apparatus.

The invention claimed is:

1. A refrigerating apparatus which comprises a refrigerant circuit in which compression mechanisms, a heat-source side heat exchanger, expansion mechanisms and application-side heat exchangers are connected together, and in which the application-side heat exchangers for a cold-storage/freezing channel and the application-side heat exchanger for an air-conditioning channel are connected in parallel to the compression mechanism and the heat-source side heat exchanger and the compression mechanisms are configured so as to be capable of switching a plurality of compressors between for the cold-storage/freezing channel and for the air-conditioning channel, wherein liquid lines for both of the channels share a liquid side communication pipe, and the liquid side communication pipe is provided adjacent to a low-pressure gas side communication pipe for a gas line in the cold-storage/freezing channel so as to contact it.

2. The refrigerating apparatus of claim 1 further comprising a liquid injection pipe for supplying a part of liquid refrigerant circulating in the refrigerant circuit to suction sides of the compression mechanisms.

3. The refrigerating apparatus of claim 1, wherein the liquid side communication pipe and the low-pressure gas side communication pipe which are disposed adjacent to each other are surrounded by a heat transfer material.

4. The refrigerating apparatus of claim 3, wherein an aluminum tape material is wound, as a heat transfer material, around the liquid side communication pipe and the low-pressure gas side communication pipe.

* * * * *